(12) United States Patent
Pudipeddi et al.

(10) Patent No.: US 11,436,019 B2
(45) Date of Patent: Sep. 6, 2022

(54) DATA PARALLELISM IN DISTRIBUTED TRAINING OF ARTIFICIAL INTELLIGENCE MODELS

(71) Applicant: Microsoft Technology Licensing, LLC, Redmond, WA (US)

(72) Inventors: Bharadwaj Pudipeddi, San Jose, CA (US); Marc Tremblay, Bellevue, WA (US); Sujeeth Subramanya Bharadwaj, Milpitas, CA (US); Devangkumar Patel, Freemont, CA (US); Jinwen Xi, Sunnyvale, CA (US); Maral Mesmakhosroshahi, Sunnyvale, CA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 78 days.

(21) Appl. No.: 16/588,402

(22) Filed: Sep. 30, 2019

(65) Prior Publication Data

US 2021/0019152 A1    Jan. 21, 2021

Related U.S. Application Data

(63) Continuation of application No. 16/577,779, filed on Sep. 20, 2019.

(Continued)

(51) Int. Cl.
*G06F 15/16* (2006.01)
*G06F 9/38* (2018.01)
(Continued)

(52) U.S. Cl.
CPC .............. *G06F 9/3877* (2013.01); *G06N 3/08* (2013.01); *H04L 67/289* (2013.01); *H04L 67/34* (2013.01)

(58) Field of Classification Search
CPC ........ G06F 9/3877; G06N 3/08; H04L 67/289; H04L 67/34
(Continued)

(56) References Cited

U.S. PATENT DOCUMENTS 8,780,114 B1 * 7/2014 Jackey ................. G06F 11/323
                                                       345/440
9,239,740 B2    1/2016 Zhao et al.
(Continued)

FOREIGN PATENT DOCUMENTS

| WO | WO-2021011118 A1 * | 1/2021 | ........... G06F 9/3877 |
| WO | WO-2021011119 A1 * | 1/2021 | ........... G06N 3/0454 |
| WO | WO-2021011120 A1 * | 1/2021 | ........... G06F 9/3877 |

OTHER PUBLICATIONS

"Non Final Office Action Issued In U.S. Appl. No. 16/577,779", dated Apr. 5, 2021, 18 Pages.
(Continued)

*Primary Examiner* — Alicia Baturay
(74) *Attorney, Agent, or Firm* — Fiala & Weaver P.L.L.C.

(57) ABSTRACT

Methods, systems, apparatuses, and computer program products are described herein that enable execution of a large AI model on a memory-constrained target device that is communicatively connected to a parameter server, which stores a master copy of the AI model. The AI model may be dissected into smaller portions (e.g., layers or sub-layers), and each portion may be executed as efficiently as possible on the target device. After execution of one portion of the AI model is finished, another portion of the AI model may be downloaded and executed at the target device. To improve efficiency, the input samples may be divided into microbatches, and a plurality of microbatches executing in sequential order may form a minibatch. The size of the group of microbatches or minibatch can be adjusted to reduce the
(Continued)

communication overhead. Multi-level parallel parameters reduction may be performed at the parameter server and the target device.

20 Claims, 8 Drawing Sheets

Related U.S. Application Data

(60) Provisional application No. 62/874,462, filed on Jul. 15, 2019, provisional application No. 62/888,902, filed on Aug. 19, 2019.

(51) Int. Cl.
*H04L 67/289* (2022.01)
*G06N 3/08* (2006.01)
*H04L 67/00* (2022.01)

(58) Field of Classification Search
USPC .......................................................... 706/12
See application file for complete search history.

(56) References Cited

U.S. PATENT DOCUMENTS

| | | | |
|---|---|---|---|
| 9,854,032 B2 | 12/2017 | Liu et al. | |
| 10,019,668 B1 | 7/2018 | Woo | |
| 10,091,215 B1 | 10/2018 | Word | |
| 10,545,732 B1 | 1/2020 | Shanahin et al. | |
| 10,628,295 B2* | 4/2020 | Gu | G06F 9/3001 |
| 10,698,897 B2* | 6/2020 | Bhattacharjee | G06F 16/951 |
| 10,698,900 B2* | 6/2020 | Bhattacharjee | G06F 16/24553 |
| 10,726,009 B2* | 7/2020 | Pal | G06F 16/24554 |
| 10,795,884 B2* | 10/2020 | Bhattacharjee | G06F 16/2465 |
| 10,832,120 B2* | 11/2020 | Diamos | G06N 3/0445 |
| 10,878,567 B1* | 12/2020 | Abid | A61B 5/0033 |
| 11,062,214 B2* | 7/2021 | Jarrett | G06N 3/0427 |
| 11,188,327 B2* | 11/2021 | Gu | G06F 7/4876 |
| 2009/0077561 A1 | 3/2009 | Feng et al. | |
| 2009/0313319 A1 | 12/2009 | Beisiegel et al. | |
| 2019/0188570 A1 | 6/2019 | Aldea Lopez | |
| 2019/0205745 A1 | 7/2019 | Sridharan et al. | |
| 2019/0243836 A1 | 8/2019 | Nanda et al. | |
| 2019/0258636 A1 | 8/2019 | Bhattacharjee et al. | |
| 2019/0258637 A1 | 8/2019 | Bhattacharjee et al. | |
| 2019/0272271 A1 | 9/2019 | Bhattacharjee et al. | |
| 2019/0303743 A1 | 10/2019 | Venkataramani et al. | |
| 2019/0310977 A1 | 10/2019 | Pal et al. | |
| 2019/0377984 A1 | 12/2019 | Ghanta et al. | |
| 2020/0050586 A1* | 2/2020 | Pal | G06F 16/148 |
| 2020/0050607 A1* | 2/2020 | Pal | G06F 16/24545 |
| 2020/0050612 A1* | 2/2020 | Bhattacharjee | G06F 16/2471 |
| 2020/0065303 A1* | 2/2020 | Bhattacharjee | G06F 11/3409 |
| 2020/0074347 A1* | 3/2020 | Sankaran | G06N 3/08 |
| 2020/0082270 A1* | 3/2020 | Gu | G06N 3/0427 |
| 2020/0090056 A1* | 3/2020 | Singhal | G06N 20/20 |
| 2020/0151551 A1* | 5/2020 | Zhang | G06N 3/08 |
| 2020/0151558 A1* | 5/2020 | Ren | G06N 3/08 |
| 2020/0171671 A1* | 6/2020 | Huang | G06N 3/08 |
| 2020/0226458 A1* | 7/2020 | de Vangel | G06N 3/063 |
| 2020/0234118 A1* | 7/2020 | Shi | G06N 3/0454 |
| 2020/0302276 A1* | 9/2020 | Yang | G06N 3/063 |
| 2020/0302288 A1* | 9/2020 | Ren | G06N 3/0454 |
| 2020/0302289 A1* | 9/2020 | Ren | G06N 3/04 |
| 2020/0311341 A1* | 10/2020 | Chaturvedi | G06N 20/00 |
| 2020/0311536 A1* | 10/2020 | Venkataramani | G06N 3/084 |
| 2020/0382437 A1* | 12/2020 | Srinivasan | H04L 41/16 |
| 2021/0019151 A1* | 1/2021 | Pudipeddi | G06N 3/08 |
| 2021/0019634 A1* | 1/2021 | Pudipeddi | G06N 3/10 |
| 2021/0034994 A1* | 2/2021 | Stocker | G06F 16/283 |
| 2021/0042620 A1* | 2/2021 | Chen | G06N 3/084 |
| 2021/0124794 A1* | 4/2021 | Nair | G06F 17/153 |
| 2022/0019889 A1* | 1/2022 | Aum | G06N 3/08 |

OTHER PUBLICATIONS

"International Search Report and Written Opinion Issued in PCT Application No. PCT/US2020/036750", dated Sep. 23, 2020, 26 Pages.

"International Search Report and Written Opinion Issued in PCT Application No. PCT/US2020/036757", dated Oct. 26, 2020, 24 Pages.

"International Search Report and Written Opinion Issued in PCT Application No. PCT/US2020/036788", dated Oct. 5, 2020, 26 Pages.

"Final Office Action Issued in U.S. Appl. No. 16/577,779", dated Jul. 23, 2021, 18 Pages.

"Non Final Office Action Issued in U.S. Appl. No. 16/588,779", dated Jun. 14, 2021, 12 Pages.

"Non Final Office Action Issued in U.S. Appl. No. 16/577,779", dated Oct. 26, 2021, 22 Pages.

"Final Office Action Issued in U.S. Appl. No. 16/588,779", dated Oct. 27, 2021, 13 Pages.

"Notice of Allowance Issued in U.S. Appl. No. 16/577,779", dated Feb. 24, 2022, 11 Pages.

"Notice of Allowance Issued in U.S. Appl. No. 16/588,779", dated Feb. 24, 2022, 11 Pages.

* cited by examiner

DATA PARALLELISM IN DISTRIBUTED TRAINING OF ARTIFICIAL INTELLIGENCE MODELS

CROSS REFERENCE TO RELATED APPLICATIONS

This application claims priority to U.S. application Ser. No. 16/577,779, filed on Sep. 20, 2019, titled "Executing Large Artificial Intelligence Models on Memory-Constrained Devices," now pending, which claims the benefit of U.S. Provisional Application No. 62/874,462, filed on Jul. 15, 2019, titled "High Throughput Distributed Training and Inference of AI Models, Data Parallelism in Distributed Training, and Dynamic Multi-Layer Execution for AI Modeling," now pending, and of U.S. Provisional Application No. 62/888,902, filed on Aug. 19, 2019, titled "High Throughput Distributed Training and Inference of AI Models, Data Parallelism in Distributed Training, and Dynamic Multi-Layer Execution for AI Modeling," now pending, all of which are incorporated by reference herein in their entireties.

This application is also related to U.S. Patent Application No. 16/588,799, titled "Dynamic Multi-Layer Execution for Artificial Intelligence Modeling," filed on same date herewith, which is incorporated by reference herein.

BACKGROUND

Artificial intelligence has an enormous impact on many aspects of modern society. Machine learning, a subset of artificial intelligence that employs mathematical algorithms to process large datasets, is gaining more popularity in business applications and is increasingly present in consumer products. Deep learning is a branch of machine learning that is based on algorithms used to model high-level abstractions in data. Many applications of artificial intelligence are driven by deep learning, such as natural language processing, speech recognition, and image analysis.

However, there are many challenges that prevent deep learning from widespread adoption. These challenges include the complexity in the management of large datasets as well as the extensive time and resources required for training deep learning networks. For example, a speech recognition program may require data from multiple dialects and demographics, which may include terabytes of data for a single language. The complexity of a deep neural network (DNN) may be expressed through the number of parameters, such that the more parameters present, the more complex the DNN. In addition, optimizing hyperparameters, which are parameters with values defined prior to the commencement of the learning process of an artificial intelligence (AI) model, can greatly affect performance of the AI model. Still further, substantial computing power is required for processing the large amount of data for training such an AI model.

In deep learning, certain classes of AI models may require the processing power of GPUs (graphics processing units) with high memory capacity. To improve throughput, multiple GPUs may be run in a data-parallel manner that often requires synchronization of hundreds of millions to billions of parameters stored separately in different GPUs. This method may be limited by the memory capacity of the GPUs and may not achieve maximum computing efficiency of the GPUs.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are described herein that enable the execution of arbitrarily large AI models on a memory-constrained target device that is communicatively connected to a parameter server. In example embodiments, multi-level parallel parameters reduction may be performed by both the target device and the parameter server.

Methods, systems, apparatuses and computer program products are further described herein that include a parameter server communicatively connected to a target device. The parameter sever comprises: a data manager configured to store a master copy of an AI model; a transmitter configured to transmit a portion of the AI model to the target device; a batch manager configured to determine a microbatch size suitable for the target device; and contemporaneously, with a set of microbatches of a training dataset being executed at the target device on a first subportion of the transmitted portion of the AI model to generate gradients, a weight updater is configured to perform reduction of parameters for a second subportion of the transmitted portion of the AI model, and the transmitter is configured to send weights for a third subportion of the transmitted portion of the AI model to the target device.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
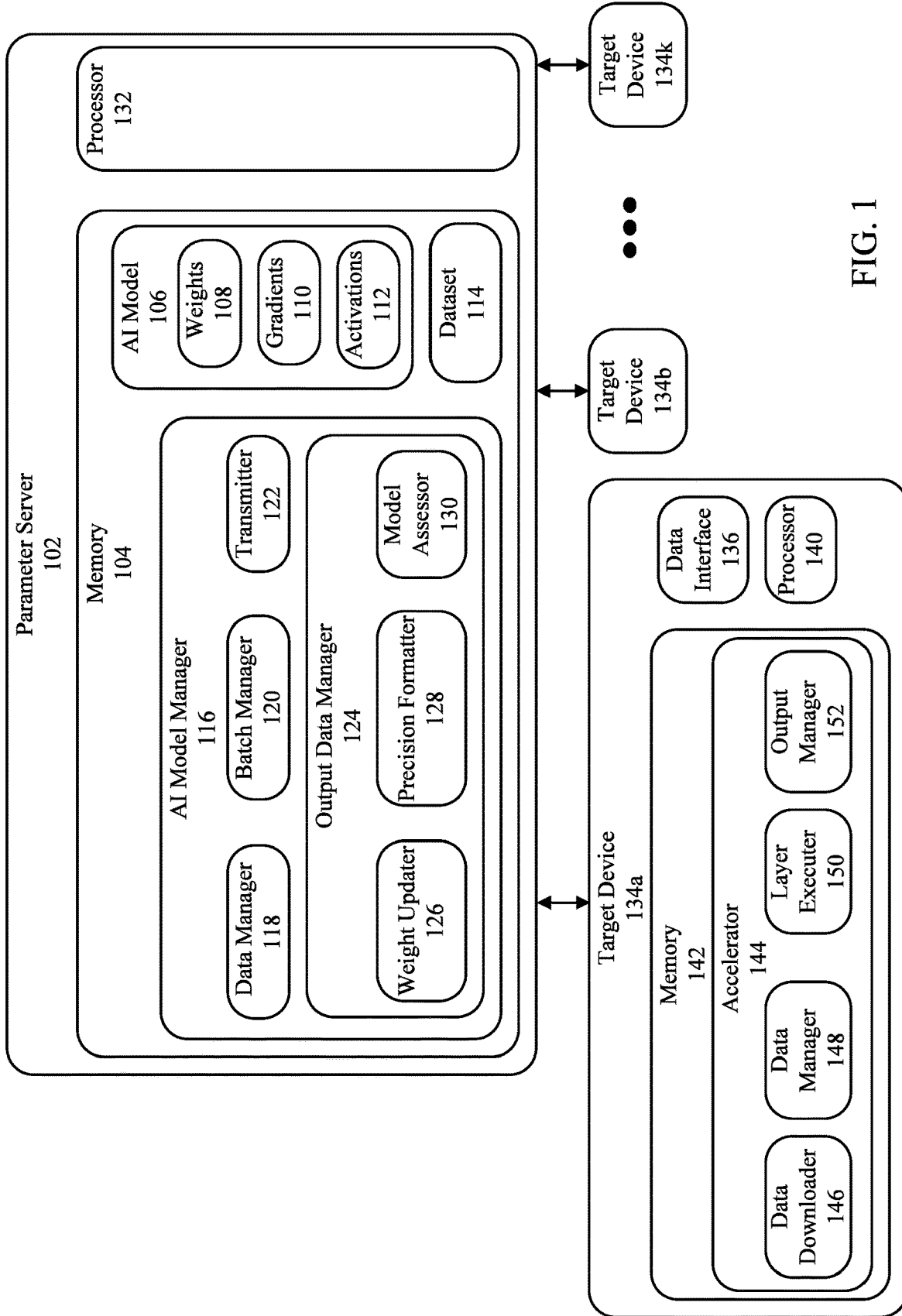
FIG. 1 is a block diagram of a system that enables execution of arbitrarily large AI models on a memory-constrained target device, according to an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

The example embodiments described herein are provided for illustrative purposes and are not limiting. The examples described herein may be adapted to any type of targeted crawling system. Further structural and operational embodiments, including modifications/alterations, will become apparent to persons skilled in the relevant art(s) from the teachings herein.

There are many applications of deep learning, including natural language processing, speech recognition, image analysis, machine translations, object classification and detection in photographs, automatic handwriting generation, automatic game playing, generative model chatbots. Deep learning models are widely applicable in a variety of tasks because of their capability of simulating the human brain.

In deep learning, AI models that are large (e.g., trained for natural language processing or image analysis) may require multiple GPUs with high memory capacity to perform their training. To improve speed, these GPUs may have high speed interfaces, such as High Bandwidth Memory (HBM) interfaces. However, even with high quality hardware, there remains ways to improve the inference and training process for large AI models. For example, there are two approaches to parallelizing the training of an AI model to improve throughput: model parallelism and data parallelism.

Model parallelism comprises dividing the learning model into parts, and placing those parts on different computational nodes (e.g., placing a first half of the layers on a first GPU and the second half of the layers on a second GPU, or splitting the layers in the middle and assigning them to separate GPUs). A typical large AI model having 24 layers, for example, may run on a GPU in the following manner. The forward pass is executed layer-by-layer on the same minibatch, such as by executing the minibatch starting on layer 1, then layer 2, and so on until layer 24. After each layer, the activations (also referred to herein as hidden activations, hidden states, or intermediate results) of that layer may be saved (e.g., on chip or off chip) for the backward pass, which may be executed in a similar layer-by-layer manner (in reverse order) on the same minibatch. For example, the minibatch may be executed on layer 24, then layer 23, and so on until layer 1, after which, the AI model is updated. Sometimes, the hidden activations may be recomputed in the backward pass as a tradeoff between the computational cost and efficient memory usage. In certain types of AI models (e.g., natural language processing), there may be many parameters but the minibatch size may be small (e.g., a few kilobytes). In other types of models, such as dense networks or computer vision models, the number of parameters may be relatively small but the hidden activations may be large. Generally, these types of models may not be run on devices that have no global memory, such as application-specific integrated circuit (ASIC) devices. Thus, the available technique used is model parallelism where the model is split across multiple devices. However, model parallelism is inefficient due to long dormant memory and compute times.

Furthermore, a GPU may have certain data structures mapped to its global memory, which is off-chip and connected with high speed memory interfaces (e.g., HBM). For example, input and output activations may reside on-chip, and sometimes, gradients as well, whereas the master copy of the weights and the hidden activations may be stored off-chip. There are several residency issues with these data structures. The weights may be loaded well in advance of their actual usage, taking up valuable memory. Hidden activations may be generated after completing the forward pass, but the hidden activations may not be required until the backward pass. Moreover, global memory data moves in and out of the chip via loads and stores, causing memory access amplification even in the presence of limited temporal buffering through caches and registers. Thus, when running a large AI model (e.g., using model parallelism or unified memory addressing techniques) in such a GPU or cluster of GPUs, the AI model size is dependent upon the number of devices and the performance penalty of communication overhead cannot be adjusted or hidden.

Data parallelism is where the input data is partitioned across computational devices, and each device holds an entire copy of the learning model, called a replica or worker. Each replica computes gradients on its part of the data, and the gradients are combined to update the model parameters. In asynchronous distributed Stochastic gradient descent (SGD), each replica accesses a shared-memory space, where global parameters are stored. After copying the parameters in its local memory, the replica may compute the gradients and the updated weight with respect to its current weight, and then apply the updated weight to the global parameters in the shared-memory space. The advantage of this configuration is the replicas can work at their own pace without waiting for others to finish computing their gradients. However, there is no way to ensure that while one replica is computing gradients with respect to a set of parameters, another replica is not updating the global parameters, leading to the global parameters being updated with stale gradients. In synchronous distributed SGD, each GPU may run a minibatch of input data (or samples), then stop execution to synchronize all the model parameters by exchanging gradients, which are the adjustments calculated by back-propagating the loss through the AI model. This method is highly limited by the memory capacity of the GPUs. In cases where the AI model requires more memory than a single GPU has, the model compilation on that GPU may fail with an out-of-memory error. Data parallelism often requires synchronization of hundreds of millions to billions of parameters stored separately in different GPUs. Thus, this approach may not achieve maximum computing efficiency of the GPUs as they need to have long pauses in computing to complete the synchronization.

Embodiments described herein overcome such difficulties, enabling the running of AI models on devices with large on-chip memories but no global memory. Embodiments described herein may execute an AI model of any arbitrary size in a fast and efficient manner in a memory-constrained device, such as a GPU, ASIC, or FPGA (field programmable gate array). In example embodiments, AI models of any arbitrary size may be executed on an ASIC that does not have global memory and yet can execute the AI models faster than GPUs. Thus, embodiments described herein enable execution of large AI models on memory-constrained devices.

Example embodiments may be implemented in a system having at least one parameter server and one target device. The master copy of an AI model may reside in the parameter server. The AI model may be dissected into smaller portions or chunks (e.g., individual layers), and each portion or layer may be executed as efficiently as possible on the target device. After a layer is done, the next layer is executed. To increase balance and efficiency, this technique iterates on the same layer across a large number of input samples until either (a) the next layer is loaded onto the target device thereby completely hiding its latency, or (b) the next layer is loaded after the current layer finishes, exposing its latency, but minimizing the overhead with a long computation cycle for the current layer. To make the current computation cycle long, the input samples may be divided into microbatches. A group of microbatches forms a minibatch, which is the term for the number of samples per update (for training) or the number served in every inference cycle (for inference). By using the size of the group of microbatches and/or minibatch as a knob that can be manually or automatically (e.g., with software of the AI frameworks) adjusted, the communication overhead can be minimized or even reduced to zero.

If an AI model may be optimized with large batch sizes, such as in the case of natural language processing models, vision models, or models with high weight/activation ratios, then embodiments described herein would allow these models to run on one or more memory-constrained devices at the highest performance. Thus, according to example embodiments, a large AI model may be executed on a target device whose memory is smaller than what is required to run the large AI model efficiently. In other words, the AI model may be executed at the smallest device batch size, at which peak efficiency in speed may be achieved (i.e., effective TFLOPs). For example, the performance of the AI model would only depend upon the efficiency of the computation throughput of the libraries running on the target device, the TFLOPs (teraFLOPS). The floating point operations per second (FLOPS) is a measure of computer performance, for example, to measure the capability of an algorithm or computer hardware to calculate one trillion floating-point operations per second. In other example embodiments, multiple target devices whose combined memories (e.g., global memory) may be smaller than what is required to run the large AI model efficiently.

A. Executing Large Artificial Intelligence Models on Memory-Constrained Target Devices Enabling execution of large AI models on memory-constrained devices may be accomplished in numerous ways. For example, FIG. 1 is a block diagram of a system that enables execution of arbitrarily large AI models on memory-constrained target devices, according to an example embodiment. As shown in FIG. 1, system 100 includes a parameter server 102 and target devices 134a-134k. While only one parameter server 102 is shown in FIG. 1, system 100 may include a plurality of parameter servers. Similarly, while target devices 134a-134k are depicted in FIG. 1, system 100 many include fewer or greater numbers of target devices. Other structural and operational embodiments will be apparent to persons skilled in the relevant art(s) based on the following discussion regarding system 100 as depicted in FIG. 1.

Parameter server 102 may include any type of computing device, mobile or stationary. Parameter server 102 may provide functionality for other programs or devices, such as sharing data or resources or performing computations. Parameter server 102 may include memory 104 configured to store data (e.g., datasets, software programs, AI models) and processor 132 configured to execute programming functions. Parameter server 102 may include commercial off-the-shelf components and/or customized components and may be a standalone device or a part of another computing device. Parameter server 102 may include other components not shown in FIG. 1, such as peripheral interfaces, communication interfaces, integrated devices, multiple processors and different types of memories. In embodiments, parameter server 102 may be implemented as one or more of a CPU, a FPGA, or an ASIC. For example, as a CPU, parameter server 102 may include electronic circuitry within a computing device that carries out the instructions of a computer program by performing operations (e.g., mathematical, logical, controlling, or input/output) based on the instructions. As an FPGA, parameter server 102 may include an array of programmable logic blocks that are configured to perform complex combination functions or other operations. As an ASIC or system-on-chip, parameter server 102 may include a customized integrated circuit configured to performed operations based on computer program instructions.

Parameter server 102 may be configured to store an AI model 106 in memory 104. AI model 106 may include weights 108 and during execution of AI model 106, activations 112 and gradients 110 may be stored in memory 104. Parameter server 102 may also store dataset 114, which may be a training or testing dataset. Parameter sever 102 may further include computer program logic (e.g., computer program code or instructions) for performing operations. For example, parameter server 102 may include AI model manager 116 configured to manage AI model 106 during inference or training of AI model 106. AI model manager 116 includes computer program logic such as data manager 118, batch manager 120, transmitter 122 and output data manager 124 for managing AI model 106. Output data manager 124 is configured to receive and manage output data, among other data, from target devices 134a-134k, for use in the management of AI model 106. Output data manager 124 includes weight updater 126 configured to update weights 108 of AI model 106, precision formatter 128 configured to manage precision (e.g., mixed-precision training, precision conversion, etc.) formats, and model assessor 132 configured to assess AI model 106 and manage the execution of AI model 106 accordingly. In example embodiments, AI model manager 116 may include fewer or greater components than shown in FIG. 1. In other embodiments, the functionalities of the components of AI model manager 116 may overlap.

Parameter server 102 may serve one or more target devices 134a-134k. Parameter server 102 may be communicatively connected to target devices 134a-134k via suitable interfaces, such as Peripheral Component Interconnect (PCI) or PCI express (PCIe), and/or networks (e.g., for cloud computing or edge computing). In example embodiments, parameter server 102 and one or more target devices 134a-134k may reside on the same chip or may reside on different chips or different devices. In example embodiments, parameter server 102 and target devices 134a-134k may include software to communicate with one another. For example, parameter server 102 may include driver software specifically designed for communication, such as sending commands (e.g., initiating function calls to target devices 134a-134k) and receiving responses.

Target devices 134a-134k may each include an instance of the features shown in FIG. 1 for target device 134a. Target device 134a includes a data interface 136, a processor 140, and a memory 142. Target devices 134a-134k may each include multiple processors and different types of interfaces and memory even though a single data interface is depicted in FIG. 1 for target device 134a. In example embodiments, target devices 134a-134k have the same hardware specifications, such as the same memory size. In other example embodiments, target devices 134a-134k may have different hardware specifications. Target devices 134a-134k may be specially designed to perform compute-intensive operations in an accelerated manner. For example, target devices may include high compute density, fixed-function processors (e.g., processor 140) as well as other general-purpose capabilities. Target devices 134a-134k may be managed by parameter server 102 to run specific computations. For example, parameter server 102 may execute a main program, which prepares input data for processing at target devices 134a-134k, invokes parallel routines (e.g., kernels) at the target devices 134a-134k, and receives results after the routines terminate. Parameter server 102 may further utilize high-level computing languages, computing platforms or frameworks that include comprehensive libraries of accelerated algorithms and data structures to make it easier to accelerate computations on target devices 134a-134k. In example embodiments, target devices 134a-134k may be implemented as GPUs (e.g., specific or general-purpose GPUs), ASICs, FPGAs, or edge devices (e.g., independent devices or microcontrollers that reside at the end or edge of a network connection and may have small memory footprints). In embodiments, target devices 134a-134k may be memory-constrained devices, although not necessarily in all cases. For example, target devices 134a-134k, individually or in one or more groups, may be memory constrained such that they cannot run large AI model efficiently due to insufficient memory. The features of target device 134a of FIG. 1 are described as follows as representative of each of target devices 134a-134k, for illustrative purposes.

Data interface 136 may be configured for interfacing target device 134a with parameter server 102 as well as other devices, including other target devices. For instance, data interface 136 may include PCI, PCIe, and/or HBM. Processor 140 is configured to perform operations as requested by parameter server 102 as well as operations specifically for target device 134a. Memory 142 is configured to store data and computer program logic, for example, memory 142 includes an accelerator 144 configured to perform functions and/or accelerate certain operations, for example, as instructed by parameter server 102. Accelerator 144 includes data downloader 146 configured to download data (e.g., models and/or data thereof, such as weights, activations and datasets), data manager 148 configured to store or otherwise manages downloaded data, layer executer 150 configured to execute AI models or portions thereof (i.e., execute a dataset on the AI models or their portions), and output manager 152 configured to manage the output data (e.g., gradients and activations) generated from the model execution, for example, by saving, sending or restoring output data. In example embodiments, accelerator 144 may include fewer or greater components than shown in FIG. 1. In other embodiments, the functionalities of the components of accelerator 144 may overlap.

Figure 2:
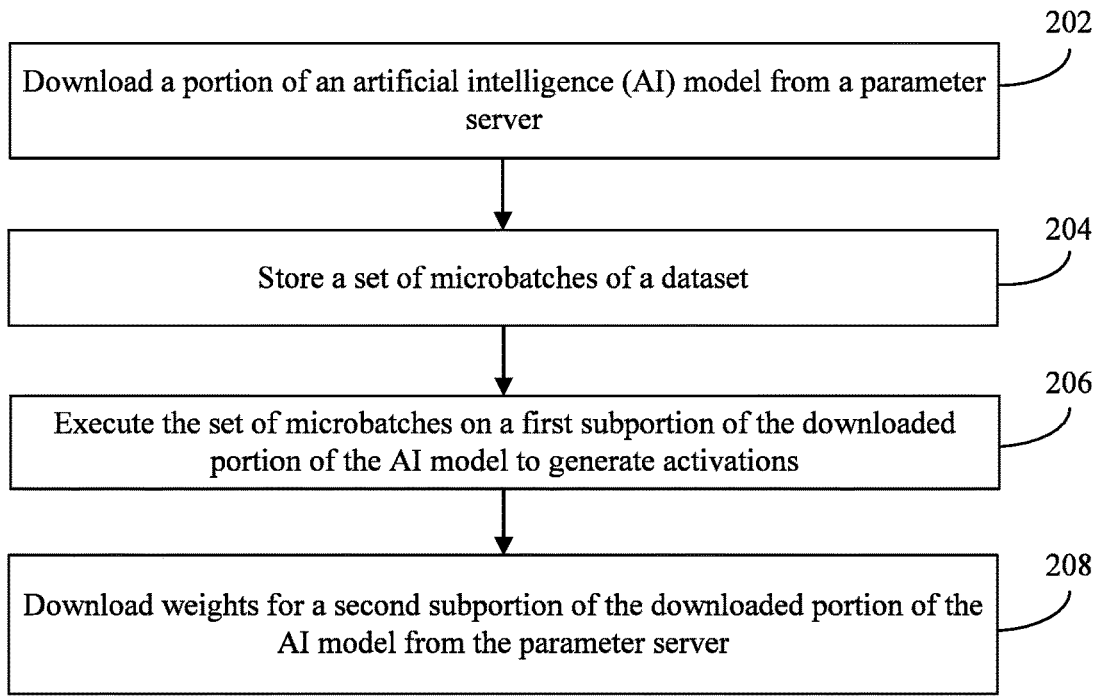
FIG. 2 shows a flowchart providing a process for running an AI model on a memory-constrained device during a forward pass, according to an example embodiment.

Further operational aspects of parameter server 102 and target device 134a are described as followed in conjunction with FIG. 2, which shows a flowchart 200 providing a process for running an AI model on a memory-constrained device during a forward pass, according to an example embodiment. Although described with reference to system 100 of FIG. 1, the process of FIG. 2 is not limited to that system. Other structural and operational embodiments will be apparent to persons skilled in the relevant art(s) based on the following discussion of flowchart 200 of FIG. 2 and system 100 of FIG. 1.

Flowchart 200 begins at step 202. At step 202, a portion of an artificial intelligence (AI) model is downloaded into memory of a target device from a parameter server that stores a master copy of the AI model. For example, target device 134a of FIG. 1, specifically data downloader 146 may be configured to download a portion of AI model 106 into memory 142 of target device 134a from parameter server 102. In an example embodiment, one or more target devices 134a-134k may form a group that is configured to run an instance of the AI model. For example, one group may include target device 134a and another group may include target devices 134b-134k. The memory required for the AI model has both invariable and variable requirements. For instance, the size of the weights or parameters may be invariable for a particular precision type (e.g., 32-bit), and the variable requirement may depend on a target device batch size. In an example embodiment, target device 134a (or a group of target devices 134a-134k) may be configured to run a large AI model, and the memory of target device 134a (or the combined memory or global memory of the group of target devices 134a-134k) may be smaller than what is required to run an AI model efficiently. Running the AI efficiently means that the AI model is run at the smallest device batch size at which peak efficiency in speed is achieved (i.e., effective TLOPs). In other words, the AI model would not benefit from a larger device batch size (no more effective TFLOPs). For instance, target device 134a may have a memory of a size smaller than a size of an entirety of the AI model for a particular optimal batch size. The optimal batch size for a target device is the batch size at which a desired accuracy (e.g., 85%) is achieved at the highest possible throughput (e.g., rate at which a dataset is processed). An optimal group batch size is the global batch size (e.g., batch size for a group of target devices) divided by the number of groups of target devices communicatively connected to parameter server 102.

AI model 106 may include any type of machine learning model, which may have a multitude of application in many fields, such as natural language processing, autonomous vehicles, image processing, deep-learning robots, automatic machine translation, automatic handwriting generation. AI model 106 may have any type of deep learning architecture, for example, deep neural networks, recurrent neural networks and convolutional neural networks.

A simple neural network may include several layers, one layer for receiving an input signal and another layer for sending an output signal. One or more hidden or processing layers may be between the input and output layers. In a DNN constructed to generate one or more inferences, there may be many hidden layers comprising of artificial neurons. Such a neuron may include an activation function, a constant input, other inputs and an output. That neuron may operate by performing the activation function on weighted versions of the inputs to product the output. Inputs to the activation function are weighted according to their respective weights. The inputs may include, for example, normalized data. The activation function may be configured to accept a single number (e.g., a linear combination of weighted inputs) based on all inputs and perform a fixed operation, such as sigmoid, tanh or rectified linear unit options. The constant input may be a constant value.

A single neuron may not accomplish much on its own, and a useful AI model generally includes the combined computational effort of a large number of neurons working in concert. For example, a DNN may include a plurality of neurons assembled in layers and connected in a cascading fashion. Those layers may include an input layer, an output layer and a few hidden layers in between. The outputs of each layer of neurons may be weighted according to certain weights and then serve as inputs to neurons in the next layer. Other interconnection strategies may be employed as is known in the art. The neurons of the input layer may be configured to accept normalized or otherwise feature engineered or processed data corresponding to user data. The output of each neuron of the input layer or hidden layer may be weighted according to weight of its corresponding output edge, and is thereafter applied as input at each neuron of the next layer. The output(s) of the output layer includes the output of the DNN or AI model. In the inference context, such output may be inference(s) or prediction(s). Construction of such a DNN is simply the start of generating a useful machine learning or AI model. The accuracy of the inferences generated by such AI model require selection of a suitable activation function, and thereafter each and every one of the weights of the entire model are adjusted to provide accurate output. The process of adjusting such weights is known as "training." Training a DNN, or other types of network, requires a collection of training data with known characteristics. For example, where a DNN is intended to predict the probability that an input image of an animal is a cat, the training data would include many different images of cats, and typically include not only cat images but also other similar animals. Training requires that the image data corresponding to each image is pre-processed according to normalization and/or feature extraction techniques as known in the art to produce input features for the DNN, and such features thereafter are provided as input to the network, for example, as input to the neurons of the input layer.

Thereafter, each neuron of a layer performs its respective activation operation, its output weighted and fed forward in a forward pass to the next layer until the output(s) of the DNN is generated by the output layer. The output(s) of the DNN may be compared to the known or expected value of the output, and the difference may be fed backward in a backward pass through the DNN to adjust the weights contained therein according to a backward propagation algorithm as known in the art. With the AI model including the updated weights, the image features may again be input to the model and new output generated. Training includes iterating the AI model over the training dataset and updating the weights at each iteration. Once the AI model achieves sufficient accuracy or its outputs have otherwise converged and weight changes have little effect, the AI model is said to be trained. A trained model may then be used to evaluate arbitrary input data, the nature of which is not known in advance, nor has the model previously considered (e.g., a new picture of an animal), and output the desired inference (e.g., the probability that the image is that of a cat).

Gradient descent is an algorithm that is often used in training AI models. Gradient descent involves an objective function (e.g., loss function or cost function), of which there may be many, and the goal is to minimize that function. The objective function is used to monitor the error in predictions of an AI model. Thus, by minimizing that function, the lowest error value may be found, thereby increasing the accuracy of the AI Model. Stochastic gradient descent (SGD) is a variation of a gradient descent algorithm that calculates the error and updates the model for each sample in the training dataset. SGD has frequent updates and faster learning, but is computationally expensive and may take longer to train on large datasets. Batch SGD is another variation that calculates the error for each sample of the training dataset but only updates the AI model after the entire dataset (i.e., at the end of a training epoch) is executed. Batch SGD has fewer updates and is more computationally efficient than SGD. The separation of the calculation of prediction errors and model update of batch SGD lends this algorithm to parallel-processing-based implementations, but updates at the end of the training epoch require additional complexity of accumulating prediction errors across the dataset and is usually implemented in a way that requires the entire training dataset in memory and available to the algorithm. Minibatch SGD is yet another variation of SGD that splits the training dataset into small batches that are used to calculate model error and update parameters. Implementations may sum the gradient over the minibatch, thereby further reducing the variance of the gradient. Thus, minibatch SGD balances between SGD and batch SGD. Minibatch SGD requires the configuration of an additional "minibatch size" hyperparameter for the learning algorithm. Error information may be accumulated across minibatches of training examples. Minibatch sizes may be configured to an aspect of the computation architecture on which the AI model is being executed, for example, power of 2 that fits the memory requirements of the target device or accelerator hardware, like 32, 64, 128, 256, etc. Batch size may serve as an adjustment on the learning process where small values give a learning process that converges quickly at the cost of noise in the training process, whereas large values give a learning process that converges slowly with accurate estimates of the error gradient.

Referring back to step 202 of FIG. 2, the downloaded portion of AI model 106 may include any portion of AI model 106. AI model 106 may be dissected into layers or composite layers or composite fractional layers (e.g., subdivided into 1.5× layer). AI models are segmented neatly at layers, therefore integral divisions of these models may be performed. In one example embodiment, the downloaded portion may include one or more layers of AI model 106. However, in another example embodiment, fractional divisions may be possible depending on the AI model and other factors. One reason why a fractional division may be desired is that such a fractional portion may fit inside a target device whereas a whole layer may not fit. This would enable an implementation where any number of layers may be run without having an out-of-memory issue, rather than encountering an out-of-memory error after a particular number of layers. In an example embodiment, the portion of AI model 106 that is downloaded to target device 134a may include any part of AI model 106 up to the entirety of AI model 106. Target device 134a may download the portion of AI model 106 in various ways. For example, target device 134a may download a next portion of AI model 106 in one or more memory buffers while executing a current portion of AI model 106. This approach may use a bit more memory and special libraries but may result in higher performance of AI model 106. In another example, target device 134a may execute the current subportion, synchronize, and then download the next subportion. This approach may be a little slower, but does not require buffering. Flowchart 200 continues with step 204.

At step 204, a set of microbatches of a dataset is stored in the memory of the target device. For example, as shown in FIG. 1, a set of microbatches of dataset 114 may be downloaded from parameter server 102 via data downloader 146. Data manager 148 may then store the set of microbatches in memory 142 of target device 134a, in a buffer or any other known memory structure. Dataset 114 may be user input data, for example a training dataset for training, a test dataset for testing purposes or arbitrary input data for inference. The set of microbatches includes a plurality of microbatches that are configured to be executed in sequential order at target device 134a. The set of microbatches forming a minibatch that includes a number of samples per update for training of AI model 106 or a number of samples served in every inference cycle for inference. Each microbatch of the set of microbatches may have a microbatch size that is automatically or manually configurable. In embodiments, the microbatch size may be selected based on a rate of execution of the plurality of microbatches and a rate of communication between target device 134a and parameter server 102. For example, a microbatch size may be initially selected for target device 134a based on its hardware specifications, and then the microbatch size may be adjusted in an iterative process as needed to adequately hide the communication latency. In embodiments, an optimal microbatch size may be a tradeoff between the memory required and the percentage of communication overhead that may be hidden. As more communication overhead is hidden, more memory may be required for computation. Thus, a microbatch size may be large enough to fully utilize a layer's execution in a target device, but is small enough to fit into the memory of that target device.

Flowchart 200 continues with step 206, which executes the set of microbatches on a first subportion of the downloaded portion of the AI model to generate activations. For instance, the set of microbatches may be executed at target device 134a by layer executer 150 on a first subportion of the portion of AI model 106 downloaded by data downloader 146. In example embodiments where the downloaded portion of AI model 106 includes one or more layers, the set of microbatches may be executed on the one or more downloaded layers of AI model 106 one layer at a time to generate activations. Activations may be values that are intermediate results, for example, the outputs of each microbatch execution. The activations may be internal data needed in the backward pass to determine how weights 108 of AI model 106 should be adjusted. After the execution of every microbatch for a subportion (e.g., a layer) of AI model 106, the activations may be saved on target device 134a, sent to parameter server 102 to save memory, or discarded to save memory and later recomputed. For example, if AI model 106 has 12 layers and 8 microbatches per minibatch, the activations may be stored 96 times during a forward pass, and restored 96 times during a backward pass. If not all of the activations are saved during the forward pass, the activations may be recomputed during the backward pass. In example embodiments, the storing of the activations for a microbatch (whether at target device 134a or at parameter 102) may occur while target device 134a is executing a different microbatch. In example embodiments, the restoring of the activations or recomputing of the activations may occur before the execution of a subportion or as needed during the execution of the subportion, for example, the restoring/recomputing of the activations for the next microbatch may occur in parallel with the execution of the current microbatch.

Flowchart 200 ends with step 208. In step 208, weights for a second subportion of the downloaded portion of the AI model is downloaded into memory of the target device from the parameter server. For instance, if the downloaded portion of the AI model includes multiple layers, then the weights for a second layer may be downloaded into memory 142 of target device 134a via data downloader 146. In example embodiments, the downloading of the weights for the next layer may occur while a current layer is being executed. For instance, target device 134a may be configured to contemporaneously execute a set of microbatches of a dataset on a second subportion using the downloaded weights for the second subportion and download weights for a third subportion of the downloaded portion of AI model 106 into memory 142 of target device 134a from parameter server 102. For example, layer executer 150 may execute a set of microbatches on one layer using weights already downloaded for that layer while, at the same time, data downloader 146 is downloading weights for the next layer of AI model 106. Alternatively, target device 134a may be configured to serially execute a set of microbatches on the second subportion using the downloaded weights for the second subportion and download weights for a third subportion of the downloaded portion of AI model 106 into memory 142 of target device 134a from parameter server 102. For instance, layer executer 150 may execute a set of microbatches on one layer using weights already downloaded for that layer, and after the execution of that one layer, data downloader 146 may download weights for the next layer of AI model 106.

Thus, the execution of AI model 106 continues as described above, with one subportion at a time, at target device 134a while other subportions of AI model 106 may also be executed at other target devices. For example, in the forward pass, a group of microbatches or a minibatch is executed on a first layer, then a second layer, and so on until the last layer.

Figure 3:
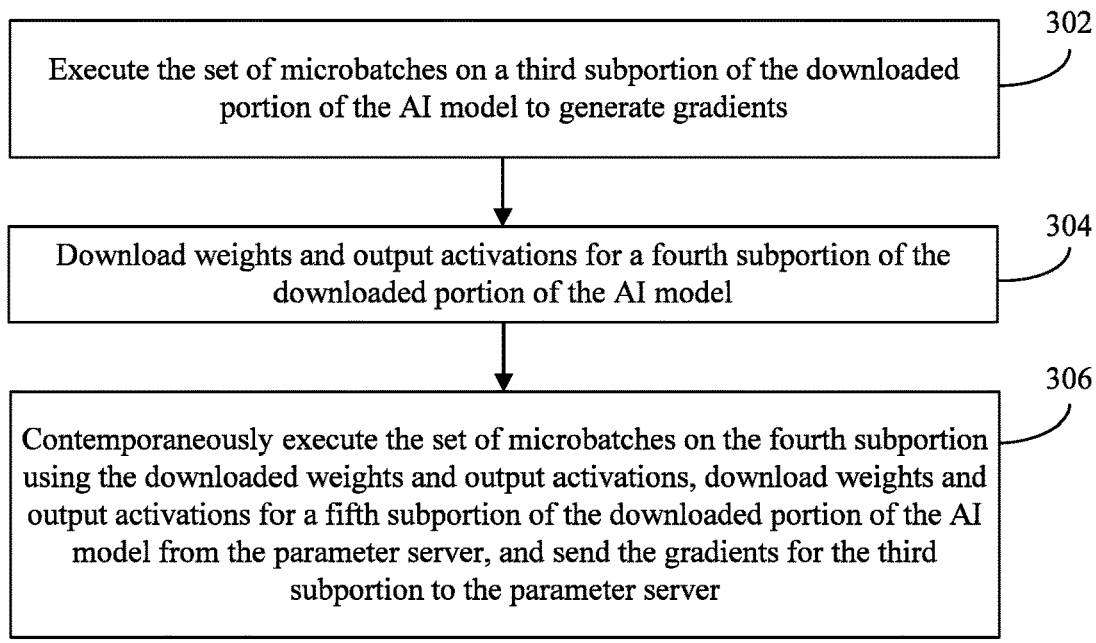
FIG. 3 shows a flowchart providing a process for running an AI model on a memory-constrained device during a backward pass, according to an example embodiment.

Once a forward pass for AI model 106 is completed, a backward pass may be performed. For example, FIG. 3 shows a flowchart 300 providing a process for running an AI model on a memory-constrained device during a backward pass, according to an example embodiment. Although described with reference to system 100 of FIG. 1, the process of FIG. 3 is not limited to that system. Other structural and operational embodiments will be apparent to persons skilled in the relevant art(s) based on the following discussion of flowchart 300 of FIG. 3 and system 100 of FIG. 1.

Flowchart 300 begins with step 302, the set of microbatches is executed on a third subportion of the downloaded portion of the AI model to generate gradients. For example, the set of microbatches may be executed by layer executer 150 on a third subportion of the downloaded portion of AI model 106 to generate gradients for the third subportion. If AI model 106 has 24 layers, then the set of microbatches may be executed on layer 24 to generate gradients for that layer to begin the backward pass.

Flowchart 300 continues with step 304. In step 304, weights and activations for a fourth subportion of the downloaded portion of the AI model are downloaded. For example, the weights and activations from a fourth subportion of the downloaded portion of AI model 106 may be downloaded by data downloader 146 to target device 134a from parameter server 102. For example, if AI model 106 has 24 layers, then the weights and activations from layer 23 may be downloaded to target device 134a from parameter server 102.

In step 306, the set of microbatches is executed on the fourth subportion using the downloaded weights and output activations, weights and output activations are downloaded for a fifth subportion of the downloaded portion of the AI model from the parameter server, and the gradients are sent for the third subportion to the parameter contemporaneously. For example, in a parallel manner at the same time or at substantially the same time, the set of microbatches may be executed by layer executer 150 on the fourth subportion using the downloaded weights and output activations for that subportion, weights and output activations are downloaded by data downloader 146 for a fifth subportion of the downloaded portion of AI model 106 from parameter server 102, and gradients are sent by output manager 152 for the third subportion of AI model 106 to parameter server 102. In an example embodiment, in which AI model 106 has 24 layers, target device 134a may be configured to perform a number of steps in parallel or contemporaneously. In this embodiment, target device 134a may be configured to contemporaneously execute layer 23 using the downloaded weights and output activations for layer 23, download weights and output activations for layer 22 from parameter 102, and send gradients 110 generated for layer 24 to parameter sever 102.

Target device 134a is configured to continue with the steps above of flowchart 300 to complete executing the entirety of dataset 114 in microbatches on AI model 106 one subportion (e.g., layer) at a time for the backward pass in reverse order (i.e., layer 24, layer 23, . . . and layer 1).

Figure 4:
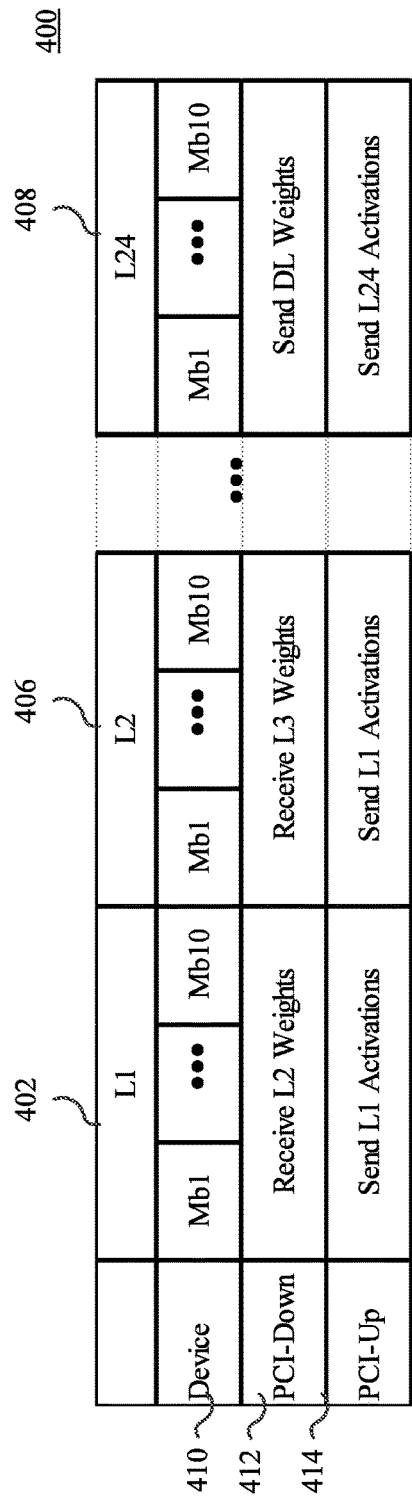
FIG. 4 shows a table representing a forward pass through a machine learning model, according to an example embodiment.
Figure 5:
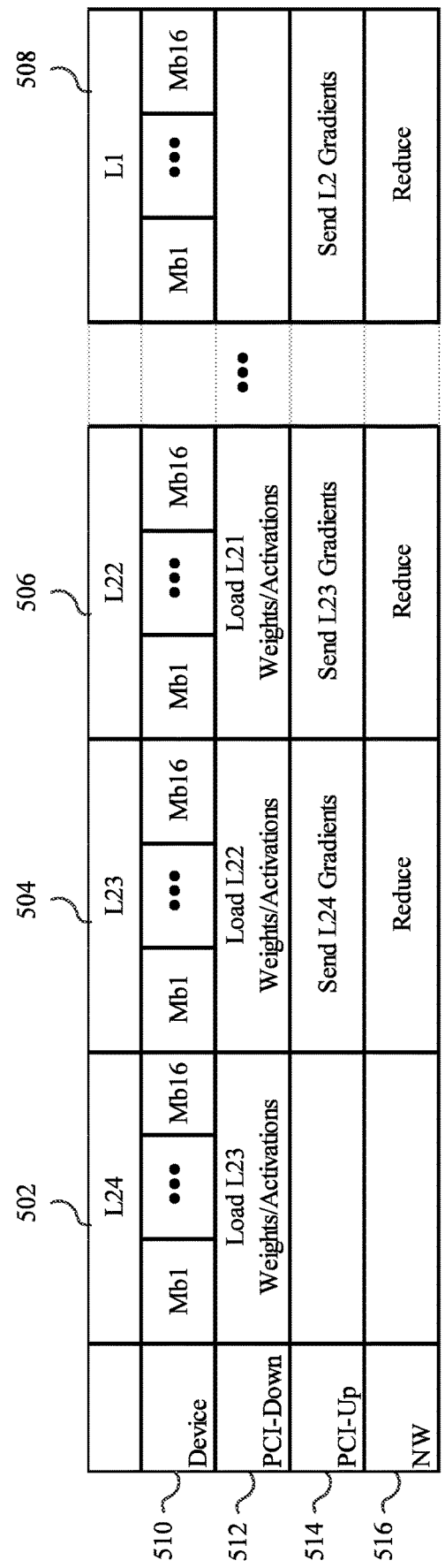
FIG. 5 shows a table representing a backward pass through a machine learning model, according to an example embodiment.

The forward and backward passes as described in FIGS. 2 and 3 may be visualized as depicted in FIGS. 4 and 5. For example, FIG. 4 shows a table 400 representing a forward pass through a machine learning model having 24 layers, according to an example embodiment. Table 400 is directed to a target device, which may be implemented as target device 134a of FIG. 1. Table 400 has three rows, row 410 shows the execution of a set of microbatches, ten of which forms a minibatch here, sequentially on each of the layers of the AI model. Row 412 shows one set of actions for the target device (e.g., receiving of weights from a parameter server), and row 414 shows another set of actions that the target device may take (e.g., sending of activations to a parameter server). The exchange of data at the target device may be accomplished via an interface, such as PCI as shown in FIG. 4. While the AI model has 24 layers, only layer 1, layer 2 and layer 24 are shown in detail in table 400, as the execution of the AI model is similar on each layer. For example, column 402 of table 400 depicts the execution of a set of ten microbatches on layer 1, the ten microbatches forming a minibatch. During this execution, the target device receives the weights for layer 2, the next layer to be executed. As each microbatch is executed on layer 1, the activations for that microbatch may be saved (e.g., at the target device or at a parameter server) as memory and/or other resources permits. Then, as shown in column 406 of table 400, the same set of ten microbatches are executed on layer 2, while the weights for layer 3 are received and the activations for each microbatch are saved. This process continues for all the layers of the AI model until the last layer, layer 24, which may be referred to as a "decoding layer" (DL) or "embedding layer" or "output layer." As the set of microbatches is being executed on the last layer, layer 24, its weights and activations are determined at the target device and sent to the parameter server as shown in column 408 of table 400.

FIG. 5 shows a table 500 representing a backward pass through a machine learning model having 24 layers, according to an example embodiment. Table 500 is directed to a target device, which may be implemented as target device 134a of FIG. 1. Table 500 has four rows, row 510 shows the execution of a set of microbatches, sixteen of which forms a minibatch here, sequentially on each of the layers of the AI model. Row 512 shows one set of actions for the target device (e.g., loading of weights and activations from a parameter server), row 514 shows another set of actions (e.g., sending of gradients to the parameter server), and row 516 shows yet another set of actions that the target device may take (e.g., reduction of parameters). The exchange of data at the target device may be accomplished via an interface, such as PCI as shown in FIG. 5. While the AI model has 24 layers, only layer 24, layer 23, layer 22 and layer 1, are shown in detail in table 500, as the execution of the AI model is similar on each layer. For example, column 502 of table 500, depicts the execution of a set of 16 microbatches on layer 24, the 16 microbatches forming a minibatch. During this execution, the target device loads the weights and activations for layer 23, the next layer to be executed in the backward pass. Then, in column 504, the set of 16 microbatches are executed on layer 23 using the loaded weights and activations. In parallel or contemporaneously (or substantially contemporaneously), the target device is configured to load the weights and activations for layer 22 (the next layer to be executed); send gradients for the recently executed layer, layer 24, to the parameter server; and reduce parameters of the AI model. In column 506, the same set of 16 microbatches are executed on layer 22 using the loaded weights and activations for that layer. During the execution of layer 22, the weights and activations for layer 21 are loaded, gradients for layer 23 are sent to the parameter server, and parameters are reduced at the target device. In column 508, the same set of 16 microbatches are executed for layer 1. Concurrently with that execution, gradients for layer 2 are sent to the parameter server and parameters are reduced at the target device.

By running many microbatches over the same layer, there is enough time to hide or cover the latency of preparing the next layer. Thus, the total memory complexity for a target device may be two layers plus the hidden activations for one layer and output activations for one layer.

Figure 6:
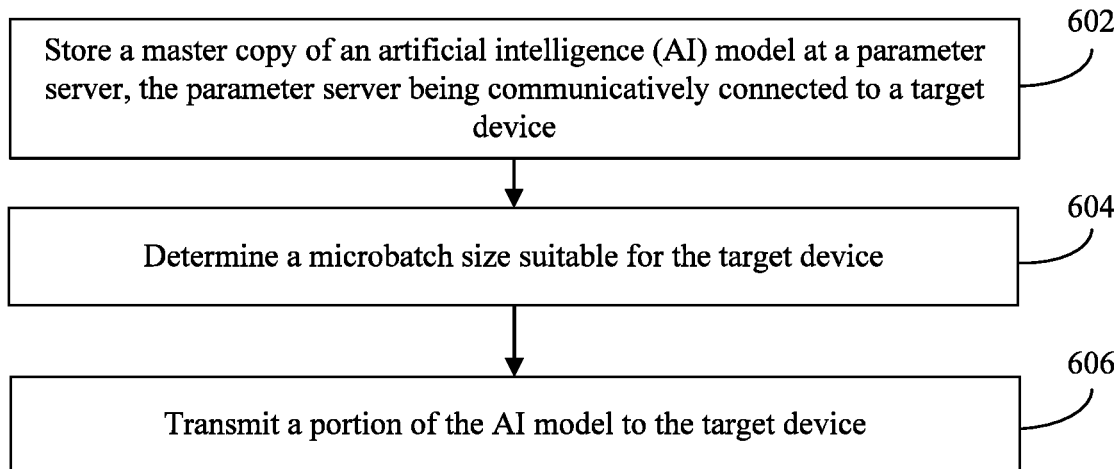
FIG. 6 shows a flowchart providing a process at a parameter server for running an AI model on a memory-constrained device, according to an example embodiment.

In the above description, for example in connection with FIGS. 2-5, the target device serves as an enabling component for executing large AI models on memory-constrained devices. In the description below, in connection with FIGS. 6-8, the parameter server may serve as the enabling component for executing large AI models on memory-constrained devices. For instance, FIG. 6 shows a flowchart 600 providing a process at a parameter server for running an AI model on a memory-constrained device, according to an example embodiment. Although described with reference to system 100 of FIG. 1, the process of FIG. 6 is not limited to that system. Other structural and operational embodiments will be apparent to persons skilled in the relevant art(s) based on the following discussion of flowchart 600 of FIG. 6 and system 100 of FIG. 1.

Flowchart 600 begins with step 602. In step 602, a master copy of an artificial intelligence model is stored at a parameter server, the parameter server being communicatively connected to a target device. For instance, as shown in FIG. 1, a master copy of AI model 106 may be stored in memory 104 of parameter server 102 by data manager 118. Parameter server 102 may communicate with target devices 134a-134k through suitable means, such as PCI and PCIe interfaces or other network interfaces. In example embodiments, parameter server 102 stores a full copy of AI model 106 whereas target devices 134a-134k may store a portion of AI model 106 rather than the entire copy of AI model 106.

In step 604, a microbatch size suitable for the target device is determined. For example, as shown in FIG. 1, target device 134a may be a memory-constrained device having a memory of a size less than an entirety of AI model 106 stored at parameter server 102 for a particular optimal batch size. Batch manager 120 is configured to determine a microbatch size suitable for target device 134a, for example, by accounting for the memory size of target device 134a and/or other hardware specifications. In an embodiment, batch manager 120 configures the microbatch size to load-balance such that the ratio of execution time over communication time is maximized. For example, the microbatch size may depend on computation time for a target device (C), the size of a subportion (S) to be transmitted, and the communication bandwidth (B) of the target device and parameter server system. In this example, the microbatch size may be determined as Minimum_numMicroBatches=SB/C. This equation may be static, but in some cases (e.g., Neural Architecture Search), the microbatch size may be dynamically determined. Thereby, enabling the parameter server to have more time to perform complex data parallelism or background tasks when the ratio of execution time and communication time can be manipulated. In example embodiments, the microbatch size may be dynamically configured at certain times or boundary points during the training or inference process. For example, the microbatch size may be dynamically configured at an end of an iteration, but has to be constant for a minibatch iteration in the forward pass and the backward pass.

Returning to FIG. 6, flowchart 600 ends at step 606. In step 606, a portion of the AI model is transmitted to the target device. For example, transmitter 122 may transmit a portion of AI model 106 to target device 134a from parameter server 102. AI model 106 may be divided into different portions in any number of ways. For example, the portion may be a layer, a composite of layers, or a composite of fractional layers of AI model 106. The portion size may be determined based on the memory available on target device 134a, such that the portion is of an optimum size for target device 134a. For example, AI model manager 116 may account for the hardware specifications of target device 134a in determining the size of the portion to send to target device 134a. Transmitter 122 may transmit one portion of AI model 106 to target device 134a while target device 134a is executing another portion, thereby requiring target device 134a to buffer that portion. Alternatively, transmitter 122 may transmit a portion of AI model 106 to target device 134a after target device 134a finishes the current portion to avoid the need to buffer the portion. In this alternate example, target device 134a may perform synchronization after execution of the current portion before receiving the portion.

Figure 7:
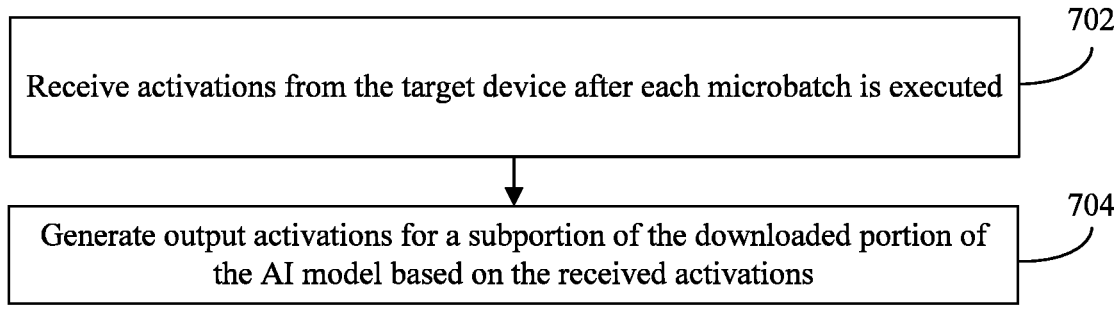
FIG. 7 shows a flowchart providing a process at a parameter server for generating activations during a forward pass, according to an example embodiment.

Parameter server 102, or AI model manager 116 specifically, may perform further steps to improve throughput in distributed training and inference of AI models on memory-constrained device. For example, FIG. 7 shows a flowchart 700 providing a process at a parameter server for generating activations during a forward pass, according to an example embodiment. Although described with reference to system 100 of FIG. 1, the process of FIG. 7 is not limited to that system. Other structural and operational embodiments will be apparent to persons skilled in the relevant art(s) based on the following discussion of flowchart 700 of FIG. 7 and system 100 of FIG. 1.

FIG. 7 begins at step 702, in which activations are received from the target device after each microbatch is executed. For example, output data manager 124 may receive activations from target devices 134a-134k after each target device executes a microbatch. For instance, activations may include hidden activations, or the intermediate results of executing a microbatch, or the output of executing a microbatch at target device 134a. In an example embodiment, activations are received from target device 134a after each microbatch. In this embodiment, saving and/or storing the activations after each microbatch provides the optimum efficiency in executing AI model 106. Thus, while target device 134a is executing a minibatch that includes a plurality of microbatches, the activations for each of the plurality of microbatches may be saved after each of the plurality of microbatches is executed. In another example embodiment, activations are saved at target device 134*a*. In yet another example embodiment, not all of the activations are saved in the forward pass, only data needed to recompute the activations on the backward pass is saved. Such data may include input states of the AI model for a particular subportion, for example, as input states may require less memory space than output states. Thus, memory space of target device 134*a* may be saved by not saving all of the activations during the forward pass.

Flowchart 700 ends with step 704, in which output activations are generated for a subportion of the downloaded portion of the AI model based on the received activations. For instance, weight updater 126 may generate output activations for a subportion of the downloaded portion of AI model 106 based on the activations received from target devices 134*a*-134*k*. In an example embodiment, the generated output activations may be saved as activations 112 in memory 104 of parameter server 102. In an example where the subportion includes a layer, the output activations for that layer may be generated by weight updater 126 from the hidden activations received after each microbatch is executed at target devices 134*a*-134*k*.

Figure 8:
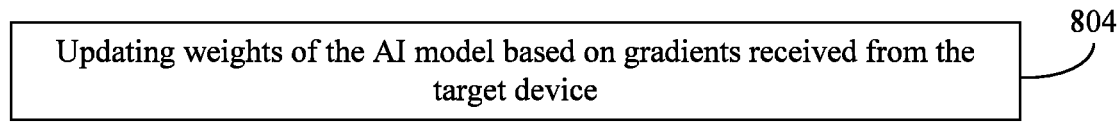
FIG. 8 shows a flowchart providing a process at a parameter server for updating an AI model, according to an example embodiment.

Parameter server 102 may perform additional steps to improve throughput in distributed training and inference of AI models on memory-constrained device. For example, FIG. 8 shows a flowchart 800 providing a process at a parameter server for updating an AI model, according to an example embodiment. Although described with reference to system 100 of FIG. 1, the process of FIG. 8 is not limited to that system. Other structural and operational embodiments will be apparent to persons skilled in the relevant art(s) based on the following discussion of flowchart 800 of FIG. 8 and system 100 of FIG. 1.

Flowchart 800 begins at step 802, in which gradients are received from the target device. For example, output data manager 124 of FIG. 1 may receive gradients from target devices 134*a*-134*k*. Gradients are the adjustments calculated by backpropagating the error in predictions through an AI model. Thus, gradients are values representing the difference between where the weights of the model are versus where the weights should be. The gradients may be placed in data structures, such as matrices. In an example embodiment, the gradients may be received after execution of every microbatch and output data manager 124 and/or weight updater 126 is configured to accumulate the received gradients until a certain number of microbatches have been executed before performing further computation with the received gradients and/or update AI model 106. In another example embodiment, the gradients may be accumulated at target devices 134*a*-134*k* for every microbatch and then sent to the parameter server 102 after completion of every minibatch.

In step 804, weights of the AI model are updated based on the received gradients. For instance, weight updater 126 of FIG. 1 may update weights 108 of AI model 106 with gradients received from target devices 134*a*-134*k*. The received gradients may be further processed (e.g., averaged) before AI model 106 is updated with the processed gradients. In an example embodiment, output data manager 124 receives the gradients after every microbatch and accumulates the gradients over a minibatch before weight updater 126 updates AI model 106 by updating weights 108. In another embodiment, output data manager 124 receives the gradients after every minibatch and weight updater 126 updates AI model 106 at that time. For example, for an image analysis model, a minibatch size may be set at 512 images, thus after the execution of 512 images, the gradients of the minibatch may be provided to the parameter server to update the model. However, if the target devices can only accommodate a microbatch of 16 images each, then the gradients may accumulate after each microbatch is executed at the target devices and only after 32 microbatches would the gradients be applied to the model. Thus, the microbatch approach is mathematically equivalent to the minibatch approach. That is, the execution of 512 images in one minibatch and then applying the gradients of that minibatch to the model is mathematically the same as the execution of 16 images in a microbatch, accumulating the gradients for each microbatch until 512 images have been executed in 32 microbatches or one minibatch, and then applying the accumulated gradients to the model.

B. Data Parallelism in Distributed Training of Artificial Intelligence Models

A challenge in deep learning is communication among the target devices when training distributed deep learning models in a large-scale environment. For example, the latency of exchanging gradients over all target devices (e.g., in an implementation without a parameter server) is a time-consuming process. Generally, in synchronized data-parallel distributed deep learning, the major computation steps include computing the gradients using a minibatch on a GPU, computing the means of the gradients by inter-GPU communication, and then updating the model. To compute the mean of the gradients, a communication operation (e.g., AllReduce) may be used to reduce a target array in all GPUs to a single array and returns the single array to all GPUs. Even in a scheme where a parameter server is used, the GPUs may be required to cache all layers of the AI model.

In example embodiments, the execution of a dataset in microbatches on one subportion of an AI model at a time provides some advantages, particularly for distributed training of such AI model in a data parallelism manner. For example, this technique enables one or more parameter servers to reduce (e.g., optimize, average, and update) all parameters of the AI model in parallel with the reduction of parameters that is happening in the target devices. Thus, the parameters reduction may occur at different levels (e.g., target device level and parameter server level) at the same time. The benefit of this technique is the zero or near-zero communication overhead in large scale data parallelism.

Figure 9:
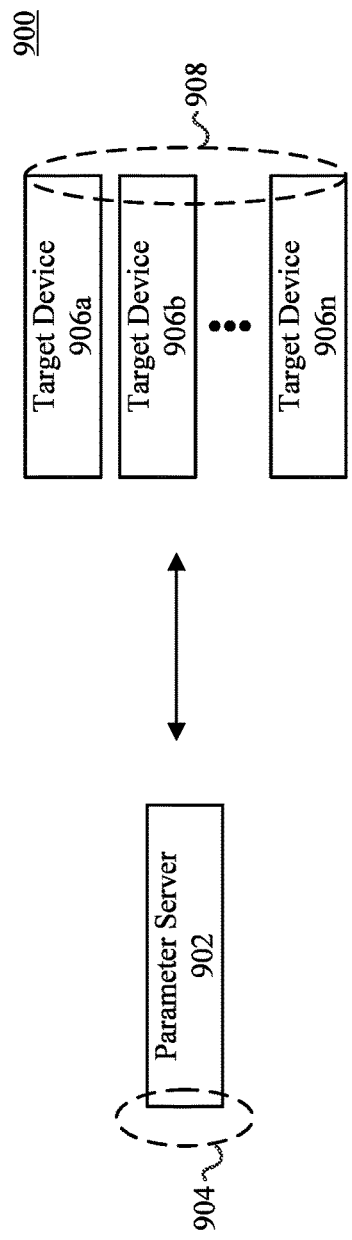
FIG. 9 shows a block diagram showing multi-level parallel reduction of parameters in a system, according to an example embodiment.

For example, FIG. 9 shows a diagram for multi-level parallel reduction of parameters in a system 900, according to an example embodiment. System 900 includes parameter server 902 and target devices 906*a*-906*n*, which may be implemented as system 100 with parameter server 102 and target devices 134*a*-134*k*. As shown in FIG. 9, while target devices 906*a*-906*n* is performing reduction of parameters for a particular subportion (e.g., a current layer) of an AI model at a target device level 908, parameter server 902 may also perform its reduction of parameters for an AI model at a parameter server level 904 for another subportion (e.g., a previous layer) of the AI model. Thus, parameter server 902 may be responsible for reduction of parameters, for example, averaging gradients and/or otherwise optimize them, and then performing the subsequent weight update of the AI model outside the target devices and in parallel with computation at the target devices, thereby speeding up the overall computation. More parameter servers may be added to system 900, and this multi-level parallel reduction of parameters technique scales well with the addition of parameter servers to reduce communication overhead even over commodity networking speeds. For example, parameter servers may be performing parameter-server-level parameters reduction in parallel with target devices performing target-device-level parameters reduction.

Figure 10:
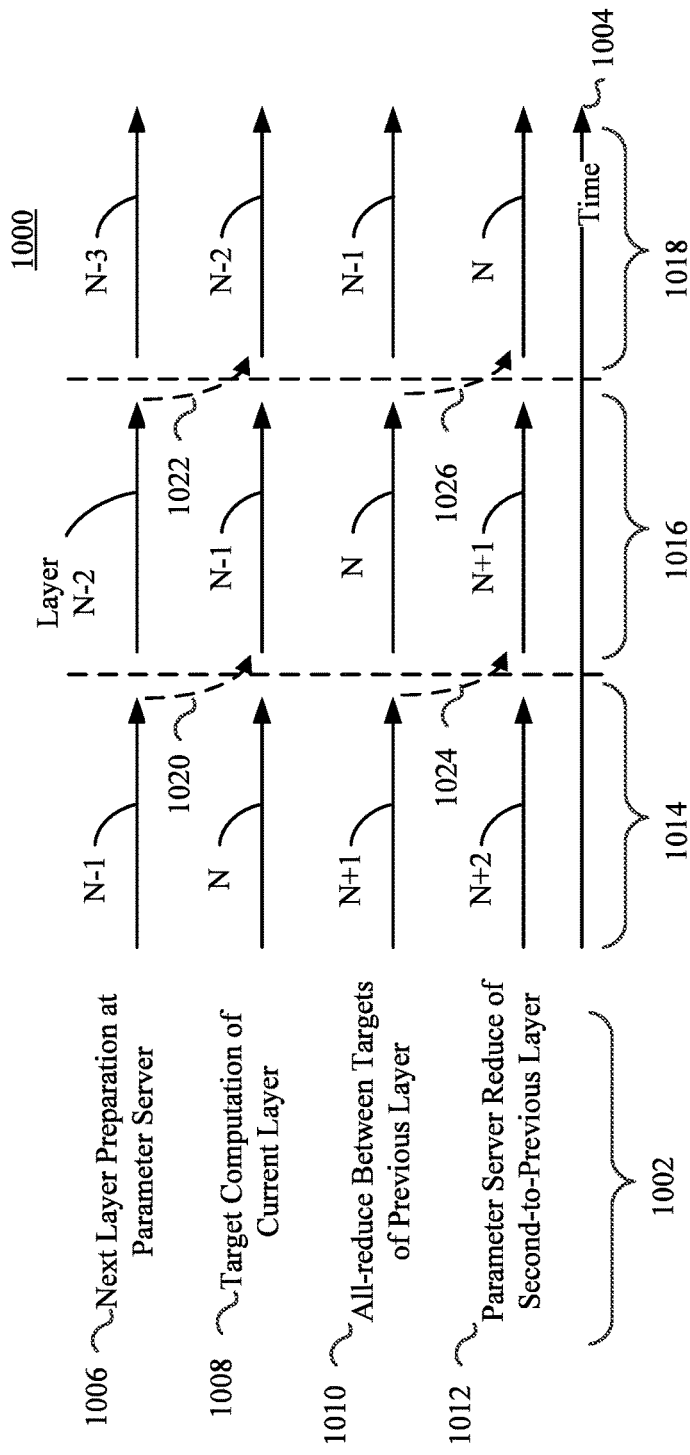
FIG. 10 shows a timing diagram for multi-level parallel reduction of parameters, according to an example embodiment.

FIG. 10 shows a timing diagram 1000 for multi-level parallel reduction of parameters in a system, according to an example embodiment. For example, diagram 1000 depicts the multi-level parallel reduction of parameters of an AI model being executed in a system, such as system 900 shown in FIG. 9. Diagram 1000 shows a time axis 1004 with different time periods 1014, 10416, and 1018. During each of the time periods, tasks 1002 related to training of the AI model performed at target devices (e.g., target devices 906a-906n of FIG. 9) and the parameter server (e.g., parameter server 902 of FIG. 9) may be performed in parallel to improve computation speed.

For example, during a first time period 1014, the target devices may perform task 1008, which is a computation of a current layer N while also performing task 1010, which is an all reduce operation between target devices of a previous layer N+1. The result 1024 of the all reduce option on previous layer N+1 is sent to the parameter sever. Also, during first time period 1014, the parameter server performs task 1006, which is the preparation of the next layer N−1, and task 1012, which is the reduction of parameters for a second-to-previous layer N+2. The preparation of the next layer N−1 includes sending necessary data 1020 (e.g., weights and activations of the AI model) to the target devices.

During a second time period 1016, the target devices may perform task 1008, which is a computation of layer N−1, based on received data 1020, while also performing task 1010, which is an all reduce operation between target devices of layer N. The result 1026 of the all reduce option on layer N is sent to the parameter sever. Also, during second time period 1014, the parameter server performs task 1006, which is the preparation of layer N−2, and task 1012, which is the reduction of parameters for layer N+1. The preparation of layer N−2 includes sending necessary data 1022 to the target devices.

During a second time period 1016, the target devices may perform task 1008, which is a computation of layer N−1, based on received data 1020, while also performing task 1010, which is an all reduce operation between target devices of layer N. The result 1026 of the all reduce option on layer N is sent to the parameter sever. Also, during second time period 1016, the parameter server performs task 1006, which is the preparation of layer N−2, and task 1012, which is the reduction of parameters for layer N+1. The preparation of layer N−2 includes sending necessary data 1022 to the target devices.

The multi-level reduction process continues at the parameter server and target devices in a similar manner for each time period until the training of the AI model is complete. For example, during a third time period 1018, the target devices may perform task 1008, which is a computation of layer N−2, based on received data 1022, while also performing task 1010, which is an all reduce operation between target devices of layer N−1. Also, during third time period 1018, the parameter server performs task 1006, which is the preparation of layer N−3, and task 1012, which is the reduction of parameters for layer N.

Figure 11:
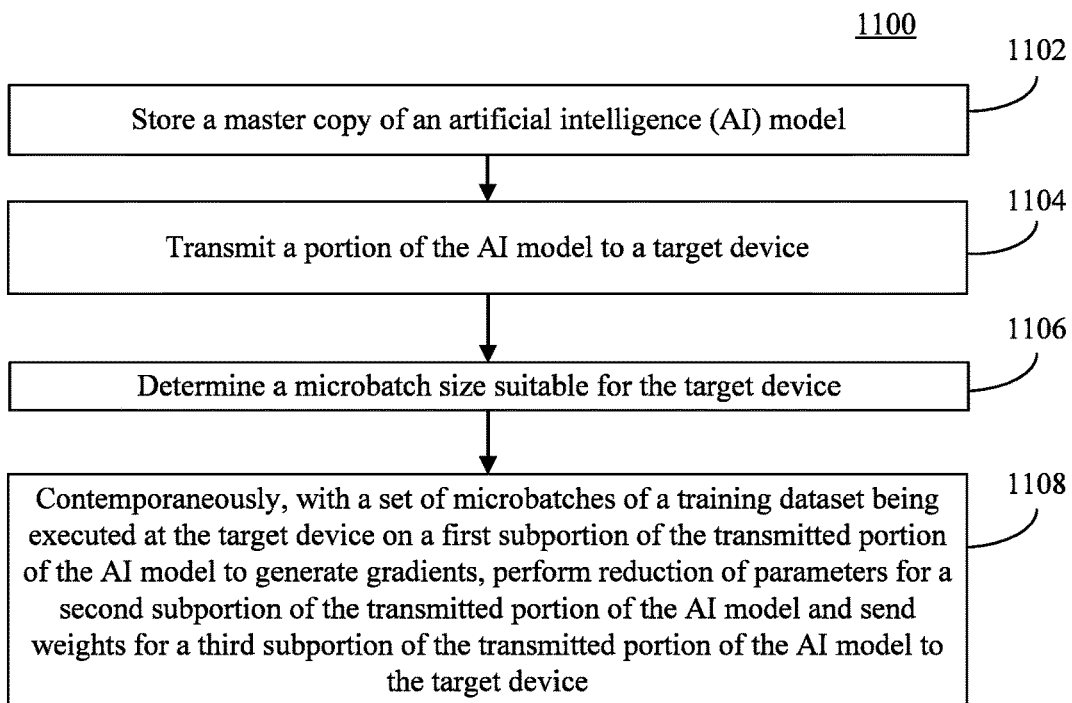
FIG. 11 shows a flowchart providing a process for parallel reduction of parameters in a system, according to an example embodiment.
Figure 12:
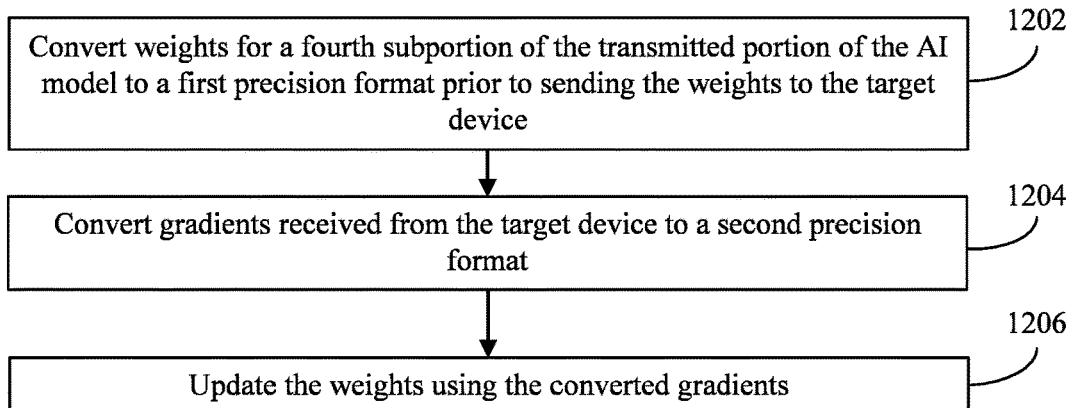
FIG. 12 shows a flowchart providing a process for mixed-precision training of an AI model, according to an example embodiment.
Figure 13:
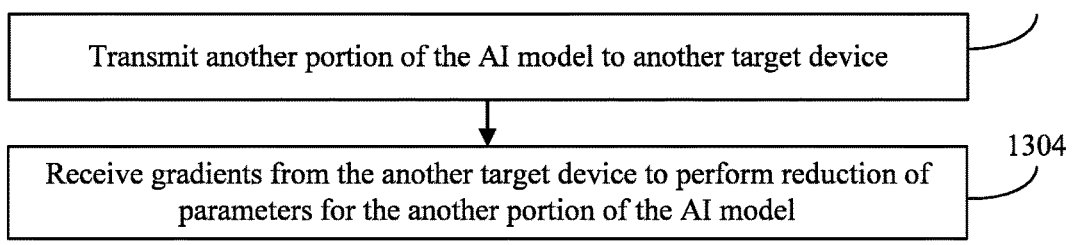
FIG. 13 shows a flowchart providing a process for training of an AI model using multiple target devices, according to an example embodiment.

The multi-level parallel reduction of parameters process may be implemented in various ways. For example, FIGS. 11-13 show this process being used in distributed training of an AI model. More specifically, FIG. 11 shows a flowchart 1100 providing a process for parallel reduction of parameters in a system, according to an example embodiment. For instance, the parallel reduction of parameters may be performed by parameter server 902 and target devices 906a-906n of system 900 as shown in FIG. 9 and/or parameter server 102 and target devices 134a-134k of system 100 as shown in FIG. 1.

Flowchart 1100 begins at step 1102, in which a master copy of an artificial intelligence model is stored. For example, as shown in FIG. 1, a master copy of AI model 106 may be stored by data manager 118 at parameter server 102 along with its associated weights 108, activations 112 and gradients 110 as AI model 106 is being trained, for example, with dataset 114.

In step 1104, a portion of the AI model is transmitted to a target device. For instance, as shown in FIG. 1, transmitter 122 transmits a portion of AI model 106 from parameter server 102 to target device 134a, which may be a memory-constrained device. Thus, in an example embodiment, target device 134a may not have sufficient memory to be able to execute AI model 106 efficiently. In another example embodiment, target device 134a may have a large enough memory to store the entirety of AI model 106 but it may be more efficient to download and store only a portion of AI model 106 as needed for execution rather than storing an instance of AI model 106 in its entirety.

In step 1106, a microbatch size suitable for the target device is determined. As described above in reference to FIGS. 2 and 6, a microbatch size may be automatically or manually configured by batch manager 120 at discrete points during training of AI model 106 based on the rate of communication between target device 134a and parameter server 102. In an embodiment, batch manager 116 may initially select the microbatch size based on hardware specifications for target device 134a and then iteratively adjust it to an optimum microbatch size, for example, based on computation time for target device 134a, size of a subportion of AI model 106 to be transmitted, and/or communication bandwidth for system 100.

Flowchart 1100 ends with step 1108. In step 1108, contemporaneously, with a set of microbatches of training dataset being executed at the target device on a first subportion of the transmitted portion of the AI model to generate gradients, reduction of parameters for a second subportion of the transmitted portion of the AI model is performed and weights for a third subportion of the transmitted portion of the AI model is sent to the target device. For example, while target device 134a executes a set of microbatches of dataset 114 on a first subportion (e.g., a current layer) of AI model 106, weight updater 126 may perform reduction of parameters for a second subportion (e.g., a second-to-previous layer) of AI model 106, and at the same time (or substantially the same time), transmitter 112 may send weights for a third subportion (e.g., a next layer) of AI model 106 to target device 134a. For example, parameter server 102 may perform these tasks according to diagram 1000 shown in FIG. 10.

In an example embodiment, weight updater 126 is configured to perform reduction of parameters with gradients received from target device 134a, the gradients being generated by target device 134a executing the set of microbatches of dataset 114 on the second subportion (e.g., a second-to-previous layer) of AI model 106 at target device 134a. Weight updater 126 is further configured to generate an average of the received gradients by any means known in the art. For example, weight updater 126 may generate the average of the received gradients by using operations and libraries provided in an AI framework. Weight updater 126 may also perform other operations on the received gradients and/or otherwise optimize them. Weight updater 126 is further configured to update AI model 106 with the average of the received gradients by updating weights 108.

In an example embodiment, target devices 134a-134k are configured to perform reduction of parameters in a similar manner as parameter server 102 for the gradients generated by target devices 134a-134k. For example, output manager 154 may generate an average of the gradients generated by target device 134a. Output manager 154 may also perform other operations on the gradients and/or otherwise optimize them.

In addition to performing the above process depicted in flowchart 1100, parameter server 102 may perform additional processes. The training of an AI model requires compute and memory resources, and for larger AI models, more compute and memory resources are needed. Deep learning systems may use single-precision (i.e., 32-bit) format, which is a common floating point format, double-precision (i.e., 64-bit) format or half-precision (i.e., 16-bit) format for a computational workload, for example, the storing and updating of data such as weights, activations and gradients. Mixed-precision methods combine the use of different numerical formats in one computational workload. By using mixed-precision training, memory bandwidth requirements may be lowered because fewer bits may be used to store the same number of values. Compute time may also be improved on processors that can provide higher throughput for reduced precision math. Moreover, certain devices and AI frameworks may include automatic support for mixed-precision methods. For example, FIG. 12 shows a flowchart 1200 providing a process for mixed-precision training of an AI model, according to an example embodiment. Other structural and operational embodiments will be apparent to persons skilled in the relevant art(s) based on the following discussion of flowchart 1200 of FIG. 12 and system 100 of FIG. 1.

Flowchart 1200 begins with step 1202, in which weights are converted for a fourth subportion of the transmitted portion of the AI model to a first precision format prior to sending the weights to the target device. For instance, as shown in FIG. 1, precision formatter 128 may convert weights 108 of AI model 106 to a first precision (e.g., half-precision) format prior to transmitter 122 sending the converted weights to target device 134a. For example, computation time may be faster with a lower precision format. In example embodiments, any precision format may be used as needed to optimize performance of AI model 106.

In step 1204, the gradients received from the target device is converted to a second precision format. For example, as shown in FIG. 1, precision formatter 128 is configured to convert gradients received from target device 134a to a second precision (e.g., single-precision) format. In example embodiments the conversion of gradients to a second precision format may be performed before or after certain operations (e.g., summation, averaging, etc.) on the received gradients. In other embodiments, the received gradients may simply be converted to a second precision format before storing in memory 104 as gradients 110.

In step 1206, weights are updated using the converted gradients. For example, as shown in FIG. 1, weights 108 of AI model 106 may be updated by weight updater 126 with the converted gradients.

In embodiments, flowchart 1200 may be performed with fewer or more steps or different steps than the ones shown. For example, different mixed-precision methods may be utilized with different precisions. For instance, for a training iteration of a subportion (e.g., a layer) of AI model 106, weights 108 may be converted to a half-precision format for the forward pass, and activations generated may also kept in the half-precision format. In the backward pass, weights 108 may be kept in the half-precision format along with gradients generated. Once the average gradients are calculated, the average gradients may be converted to a single-precision format before updating weights 108 for AI model 106. Many other operational embodiments may be realized with system 100 for a multitude of reasons. For example, weight updates (e.g., weight gradients multiplied by a learning rate) may become too small to be represented in half-precision to maintain model accuracy. Single or double-precision format may cause a longer computational time and/or resources to train a model.

Parameter server 102 may perform further processes to manage target devices 134a-134k. For example, FIG. 13 shows a flowchart 1300 providing a process for training of an AI model using multiple target devices, according to an example embodiment. Other structural and operational embodiments will be apparent to persons skilled in the relevant art(s) based on the following discussion of flowchart 1300 of FIG. 13 and system 100 of FIG. 1.

Flowchart 1300 begins with step 1302, in which another portion of the AI model is transmitted to another target device. For example, transmitter 122 may transmit another portion of AI model 106 to another target device, such as target device 906n shown in FIG. 9. In example embodiments, multiple target devices may be used to accelerate the training time for an AI model. System 900 may include any number of target devices, from one to many, each being communicatively connected to parameter server parameter server 902 via one or more suitable interfaces (e.g., PCI or PCIe).

In step 1304, gradients are received from the another target device to perform reduction of parameters for the another portion of the AI model. To continue with the example of step 1302, target device 906n may send gradients to be received by output data manager 124 at parameter server 902 for the portion of AI model 106 that target device 906n received and executed on.

C. Dynamic Multi-Layer Execution for Artificial Intelligence Modeling

Another significant advantage of the above execution paradigm, the execution of a dataset in microbatches on one subportion of an AI model at a time, is that it requires only a subportion or a part thereof (e.g., a layer or a sub-layer) to be statically defined, rather than the entire model computation graph as conventionally required. Thus, the number of layers within the AI model may be dynamically modified based on any number of factors, for example, based on performance, an alternate dataset, or other statistical observations.

A new class of models based on Neural Architecture Search (NAS) and its probabilistic counterparts is emerging, and a frictionless approach to dynamic execution provides improved modeling techniques that are currently very challenging to develop. NAS is a technique or algorithm that searches for the best neural network architecture based on a defined set of building blocks that may be used for the neural network to be built. These building blocks may be sampled and pieced together to build a network similar to other known networks in the art, but may include different combinations and configuration of the building blocks. The NAS-built network may be trained and tested, and based on the test results, the building blocks may be adjusted. The NAS-built network may be improved with operations such as adding a layer, removing a layer or otherwise changing a layer.

Figure 14:
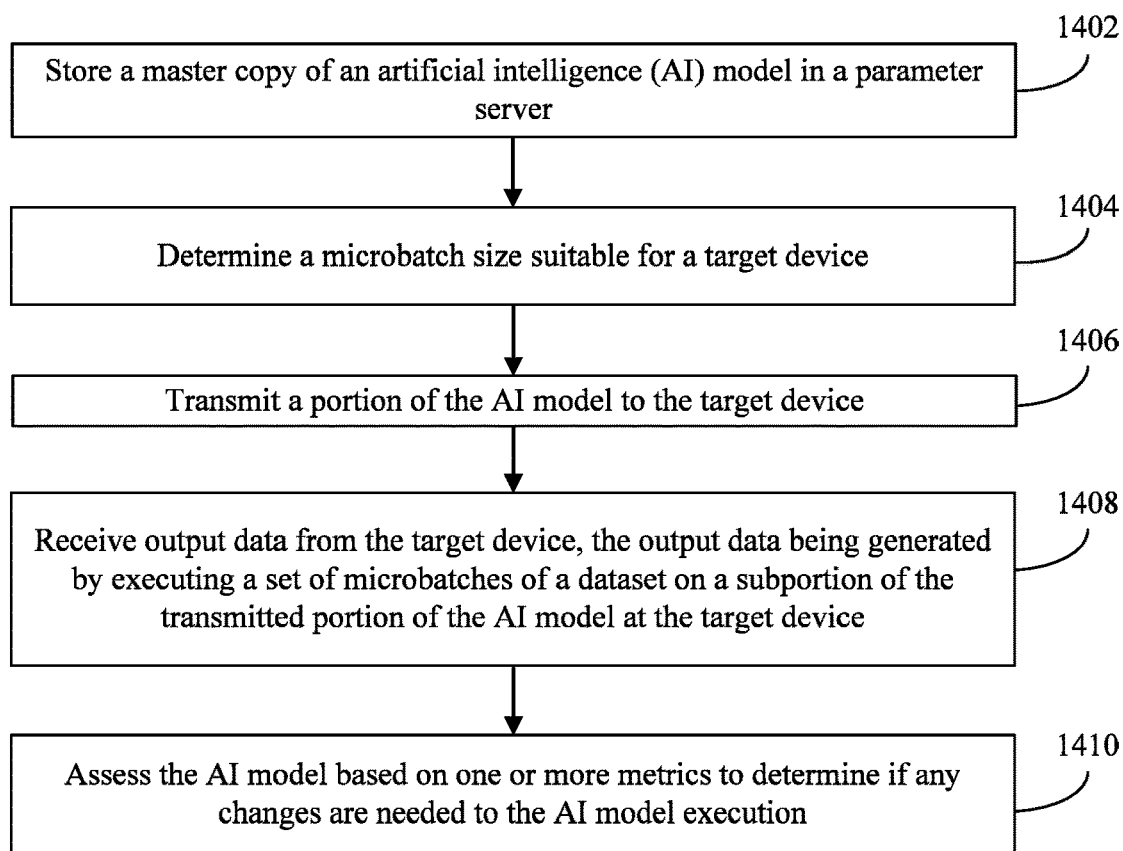
FIG. 14 shows a flowchart providing a process for dynamic execution for AI modeling, according to an example embodiment.

Thus, the technique that allows the number of layers within an AI model to be dynamically modified based on any number of factors is quite beneficial in the area of NAS and other applications. For example, FIG. 14 shows a flowchart 1400 providing a process for dynamic execution for AI modeling, according to an example embodiment. Although described with reference to system 100 of FIG. 1, the method of FIG. 14 is not limited to that system. Other structural and operational embodiments will be apparent to persons skilled in the relevant art(s) based on the following discussion regarding system 100 of FIG. 1. Flowchart 1400 may include steps already described above in reference to, for example, FIGS. 1, 2 and 6, and thus they may not be described in detail again below for the sake of brevity.

Flowchart 1400 begins with step 1402, in which a master copy of an artificial intelligence model is stored in a parameter server. For instance, as shown in FIG. 1, data manager is configured to store a master copy of AI model 106 in memory 104 of parameter server 102.

In step 1404, a microbatch size suitable for a target device is determined. For instance, batch manager 120 may be configured to determine a microbatch size suitable for target device 134a. In an example embodiment, target device 134a may be a memory-constrained device such that the memory of target device 134a may be insufficient to execute AI model 106 efficiently. In an alternate embodiment, target device 134a may be able to accommodate AI model 106 in its entirety. However, in this embodiment, it may be more efficient or otherwise more desirable to download and store only a portion of AI model 106 at a given time rather than an instance of AI model 106 in its entirety.

In step 1406, a portion of the AI model is transmitted to the target device. For instance, transmitter 122 may be configured to transmit a portion of AI model 106 to target device 120b.

In step 1408, output data from the target device may be received, the output data being generated by executing a set of microbatches of a dataset on a subportion of the transmitted portion of the AI model at the target device. For example, output data manager 124 may be configured to receive output from target device 134a of FIG. 1. The output data may be generated by executing a set of microbatches of a dataset (e.g., dataset 114) of a subportion (e.g., a layer or a sub-layer) of the transmitted portion of AI model 106 at target device 134a. The output data may be, for example, activations and gradients, respectively generated on a forward pass and a backward pass for inference or for training of AI model 106. In an example embodiment, rather than output data, target device 134a may send a signal indicating that the set of microbatches have been executed at target device 134a. Parameter server 102 may then be configured to act (e.g., perform subsequent steps) based on this signal rather than based on the output data.

Flowchart 1400 concludes with step 1410. In step 1410, the AI model is assessed based on a one or more metrics to determine if any changes are needed to the AI model execution. For example, model assessor 130 may be configured to assess AI model 106 based on one or more metrics to determine if any changes are needed to the execution of AI model 106, for example, to dynamically increase or decrease the number of layers to be executed.

Figure 15:
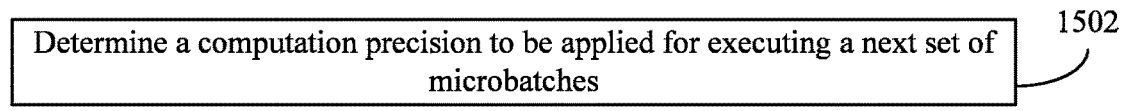
FIG. 15 shows a flowchart providing a process of determining a computation precision for dynamic execution for AI modeling, according to an example embodiment.

The one or more metrics may be based on any number of factors, such as current performance, an alternate dataset, or other statistical observations. In an example embodiment, the one or more metrics includes a precision statistic of gradients and weights for a subportion (e.g., a layer or sub-layer) of the transmitted portion of AI model 106. For example, FIG. 15 shows a flowchart providing a process of determining a computation precision for dynamic execution for AI modeling, according to an example embodiment. Although described with reference to system 100 of FIG. 1, the method of FIG. 15 is not limited to that system. Other structural and operational embodiments will be apparent to persons skilled in the relevant art(s) based on the following discussion regarding system 100 of FIG. 1.

Flowchart 1500 includes step 1502. In step 1502, a computation precision to be applied for executing a next set of microbatches is determined. For example, precision formatter 128 may be configured to determine a computation precision to be applied for executing a next set of microbatches. The computation precision may be fixed point representations (e.g., 16-bit, 32-bit, 64-bit) of the gradients and weights. For example, to improve energy efficiency or bit storage of data or any other reason, precision formatter 128 may be configured to determine a suitable precision to apply in executing the next set of microbatches at target device 134a. In an example embodiment, precision formatter 128 may be configured to detect vanishing gradients and adjust the computation precision accordingly without requiring any particular method to be implemented.

Figure 16:
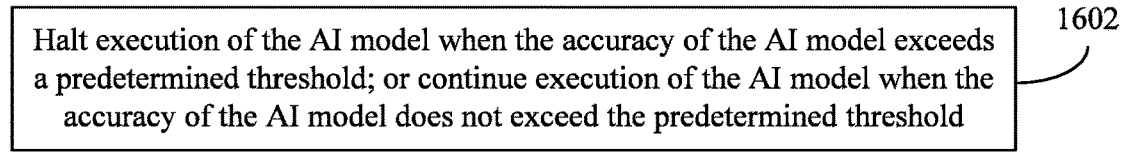
FIG. 16 shows a flowchart for providing a process of determining whether to halt or continue execution of the AI model based on an accuracy of the AI model, according to an example embodiment.

In another embodiment, the one or more metrics includes an accuracy measure of the AI model. For example, FIG. 16 shows a flowchart 1600 providing a process of determining whether to halt or continue execution of the AI model based on an accuracy of the AI model. Although described with reference to system 100 of FIG. 1, the method of FIG. 16 is not limited to that system. Other structural and operational embodiments will be apparent to persons skilled in the relevant art(s) based on the following discussion regarding system 100 of FIG. 1.

Flowchart 1600 includes step 1602. In step 1602, execution of the AI model is halted when the accuracy of the AI model exceeds a predetermined threshold, or execution of the AI model is continued when the accuracy of the AI model does not exceed the predetermined threshold. For instance, model accessor 130 of FIG. 1 is configured to determine whether to halt or continue execution of the AI model based on an accuracy of the AI model. That is, model accessor 130 may halt execution of the AI model when the accuracy of the AI model exceeds a predetermined threshold or may continue execution of the AI model when the accuracy of the AI model does not exceed the predetermined threshold. For instance, the accuracy measure for AI model 106 may be a classification accuracy, which is the ratio of the number of correct predictions to the total number of input samples. In an example embodiment, the execution of AI model 106 may be halted when the accuracy measure of AI model 106 exceeds a predetermined threshold, which may be any predefined value, such as 95 percent. According to this example embodiment, the execution of AI model 106 may be continued when the accuracy measure of AI model 106 does not exceed the predetermined threshold of 95 percent, e.g., when the accuracy is at 80 percent. In an example embodiment, the continuation of execution of AI model 106 may be dynamically determined for some number of layers or until the next assessment of AI model 106, for example. In an example embodiment, the AI model 106 may be executed by one subportion (e.g., a layer or sub-layer) at a time and AI model 106 may be assessed after each subportion is executed.

Other metrics may be used in assessing AI model 106, for example, logarithmic loss, metrics derived from a confusion matrix, area under curve, F1 score, mean absolute error, mean squared error. When other metrics are used, the appropriate threshold for each metric may be determined and applied in the assessment of AI model 106. Other factors such as a new dataset being used may cause AI model 106 to be assessed and/or its execution changed.

In the foregoing discussion of flowcharts 200, 300, 600-800, and 1100-1600, it should be understood that at times, such steps may be performed in a different order or even contemporaneously with other steps. Other operational embodiments will be apparent to persons skilled in the relevant art(s). Note also that the foregoing general description of the operations of systems 100 and 900 are provided for illustration only, and embodiments of systems 100 and 900 may comprise different hardware and/or software, and may operate in manners different than described above.

III. Example Computer System Implementation

Each of parameter server 102, target devices 134a-134k, parameter server 904 and target devices 906a-906n, and flowcharts 200, 300, 600-800, and/or 1100-1600 may be implemented in hardware, or hardware combined with software and/or firmware. For example, parameter server 102, target devices 134a-134k, parameter server 904 and target devices 906a-906n, and flowcharts 200, 300, 600-800, and/or 1100-1600 may be implemented as computer program code/instructions configured to be executed in one or more processors and stored in a computer readable storage medium. Alternatively, parameter server 102, target devices 134a-134k, parameter server 904 and target devices 906a-906n, and flowcharts 200, 300, 600-800, and/or 1100-1600 may be implemented as hardware logic/electrical circuitry.

For instance, in an embodiment, one or more, in any combination, of parameter server 102, target devices 134a-134k, parameter server 904 and target devices 906a-906n, and flowcharts 200, 300, 600-800, and/or 1100-1600 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 17:
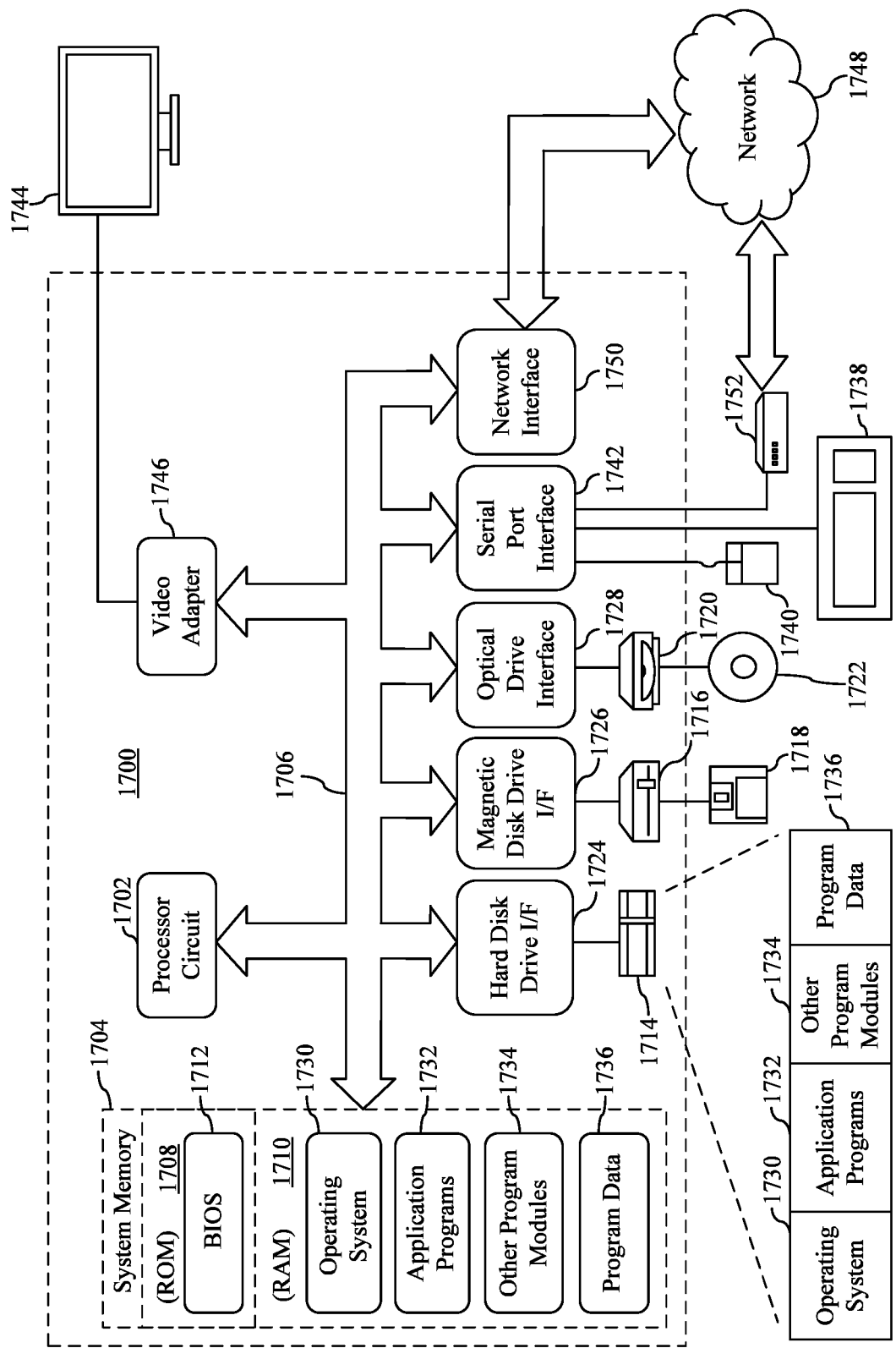
FIG. 17 is a block diagram of an example computer system in which embodiments may be implemented.

FIG. 17 depicts an exemplary implementation of a computing device 1700 in which embodiments may be implemented. For example, parameter server 102, target devices 134a-134k, parameter server 904 and target devices 906a-906n may each be implemented in one or more computing devices similar to computing device 1700 in stationary or mobile computer embodiments, including one or more features of computing device 1700 and/or alternative features. The description of computing device 1700 provided herein is provided for purposes of illustration, and is not intended to be limiting. Embodiments may be implemented in further types of computer systems, as would be known to persons skilled in the relevant art(s).

As shown in FIG. 17, computing device 1700 includes one or more processors, referred to as processor circuit 1702, a system memory 1704, and a bus 1706 that couples various system components including system memory 1704 to processor circuit 1702. Processor circuit 1702 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1702 may execute program code stored in a computer readable medium, such as program code of operating system 1730, application programs 1732, other programs 1734, etc. Bus 1706 represents one or more of any of several types of bus structures, including a memory bus or memory controller, a peripheral bus, an accelerated graphics port, and a processor or local bus using any of a variety of bus architectures. System memory 1704 includes read only memory (ROM) 1708 and random access memory (RAM) 1710. A basic input/output system 1712 (BIOS) is stored in ROM 1708.

Computing device 1700 also has one or more of the following drives: a hard disk drive 1714 for reading from and writing to a hard disk, a magnetic disk drive 1716 for reading from or writing to a removable magnetic disk 1718, and an optical disk drive 1720 for reading from or writing to a removable optical disk 1722 such as a CD ROM, DVD ROM, or other optical media. Hard disk drive 1714, magnetic disk drive 1716, and optical disk drive 1720 are connected to bus 1706 by a hard disk drive interface 1724, a magnetic disk drive interface 1726, and an optical drive interface 1728, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1730, one or more application programs 1732, other programs 1734, and program data 1736. Application programs 1732 or other programs 1734 may include, for example, computer program logic (e.g., computer program code or instructions) for implementing parameter server 102, target devices 134a-134k, parameter server 904 and target devices 906a-906n, and flowcharts 200, 300, 600-800, and/or 1100-1600 (including any suitable step of flowcharts 200, 300, 600-800, and/or 1100-1600), and/or further embodiments described herein.

A user may enter commands and information into the computing device 1700 through input devices such as keyboard 1738 and pointing device 1740. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1702 through a serial port interface 1742 that is coupled to bus 1706, but may be connected by other interfaces, such as a parallel port, game port, or a universal serial bus (USB).

A display screen 1744 is also connected to bus 1706 via an interface, such as a video adapter 1746. Display screen 1744 may be external to, or incorporated in computing device 1700. Display screen 1744 may display information, as well as being a user interface for receiving user commands and/or other information (e.g., by touch, finger gestures, virtual keyboard, etc.). In addition to display screen 1744, computing device 1700 may include other peripheral output devices (not shown) such as speakers and printers.

Computing device 1700 is connected to a network 1748 (e.g., the Internet) through an adaptor or network interface 1750, a modem 1752, or other means for establishing communications over the network. Modem 1752, which may be internal or external, may be connected to bus 1706 via serial port interface 1742, as shown in FIG. 17, or may be connected to bus 1706 using another interface type, including a parallel interface.

As used herein, the terms "computer program medium," "computer-readable medium," and "computer-readable storage medium" are used to refer to physical hardware media such as the hard disk associated with hard disk drive 1714, removable magnetic disk 1718, removable optical disk 1722, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1732 and other programs 1734) may be stored on the hard disk, magnetic disk, optical disk, ROM, RAM, or other hardware storage medium. Such computer programs may also be received via network interface 1750, serial port interface 1742, or any other interface type. Such computer programs, when executed or loaded by an application, enable computing device 1700 to implement features of embodiments described herein. Accordingly, such computer programs represent controllers of the computing device 1700.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

A system is described herein. In one embodiment, the system comprises: a parameter server communicatively connected to a target device, the parameter server comprises: a data manager configured to store a master copy of an artificial intelligence (AI) model; a transmitter configured to transmit a portion of the AI model to the target device; a batch manager configured to determine a microbatch size suitable for the target device; and contemporaneously, with a set of microbatches of a training dataset being executed at the target device on a first subportion of the transmitted portion of the AI model to generate gradients, a weight updater is configured to perform reduction of parameters for a second subportion of the transmitted portion of the AI model, and the transmitter is further configured to send weights for a third subportion of the transmitted portion of the AI model to the target device.

In one embodiment of the foregoing system, the weight updater is configured to perform reduction of parameters by receiving gradients from the target device, the gradients being generated by the target device executing the set of microbatches of the training dataset on the second subportion at the target device; and generating an average of the received gradients.

In another embodiment of the foregoing system, the weight updater is further configured to update the AI model with the average of the received gradients.

In an additional embodiment of the foregoing system, the set of microbatches includes a plurality of microbatches that are configured to be executed in sequential order, the set of microbatches forming a minibatch that comprises a number of samples per update for training of the AI model.

In yet an additional embodiment of the foregoing system, the microbatch size is configurable based on a rate of executing the set of microbatches at the target device and a rate of communication between the target device and the parameter server.

In a further embodiment of the foregoing system, the parameter server further comprises a precision formatter configured to convert weights for a fourth subportion of the transmitted portion of the AI model to a first precision format prior to sending the weights to the target device; convert gradients received from the target device to a second precision format; and update the weights using the converted gradients.

In another embodiment of the foregoing system, the transmitter is further configured to transmit another portion of the AI model to another target device; and the weight updater is further configured to receive gradients from the another target device to perform reduction of parameters for the another portion of the AI model.

A method implemented in a parameter server is described herein. The method includes storing a master copy of an artificial intelligence (AI) model; transmitting a portion of the AI model to a target device; determining a microbatch size suitable for the target device; and contemporaneously, with a set of microbatches of a training dataset being executed at the target device on a first subportion of the transmitted portion of the AI model to generate gradients, performing reduction of parameters for a second subportion of the transmitted portion of the AI model and sending weights for a third subportion of the transmitted portion of the AI model to the target device.

In another embodiment of the foregoing method, the performing reduction of parameters comprises receiving gradients from the target device, the gradients being generated from executing the set of microbatches of the training dataset on the second subportion at the target device; and generating an average of the received gradients.

One embodiment of the foregoing method further includes updating the AI model with the average of the received gradients.

In another embodiment of the foregoing method, the set of microbatches comprises a plurality of microbatches that are configured to be executed in sequential order, the set of microbatches forming a minibatch that comprises a number of samples per update for training or a number of samples served in every inference cycle for inference.

In an additional embodiment of the foregoing method, the microbatch size is configurable based on a rate of executing the set of microbatches at the target device and a rate of communication between the target device and the parameter server.

Another embodiment of the foregoing method further comprises converting weights for a fourth subportion of the transmitted portion of the AI model to a first precision format prior to sending the weights to the target device; converting gradients received from the target device to a second precision format; and updating the weights using the converted gradients.

Yet another embodiment of the foregoing method further comprises transmitting another portion of the AI model to another target device; and receiving gradients from the another target device to perform reduction of parameters for the another portion of the AI model.

A computer program product is also described herein. The computer program product includes a computer-readable storage device having computer program logic recorded thereon that when executed by a processor-based computer system causes the processor-based system to perform a method, the method includes: storing a master copy of an artificial intelligence (AI) model at a parameter server; transmitting a portion of the AI model to a target device; determining a microbatch size suitable for the target device; and contemporaneously, with a set of microbatches of a training dataset being executed at the target device on a first subportion of the transmitted portion of the AI model to generate gradients, performing reduction of parameters for a second subportion of the transmitted portion of the AI model and sending weights for a third subportion of the transmitted portion of the AI model to the target device.

In an embodiment of the foregoing computer program product, the performing reduction of parameters comprises receiving gradients from the target device, the gradients being generated from executing the set of microbatches of the training dataset on the second subportion at the target device; and generating an average of the received gradients.

In one embodiment of the foregoing computer program product, the method further comprises updating the AI model with the average of the received gradients.

In an additional embodiment of the foregoing computer program product, the set of microbatches includes a plurality of microbatches that are configured to be executed in sequential order, the set of microbatches forming a minibatch that comprises a number of samples per update for training of the AI model.

In yet another additional embodiment of the foregoing computer program product, the microbatch size is configurable based on a rate of executing the set of microbatches at the target device and a rate of communication between the target device and the parameter server.

In an embodiment of the foregoing computer program product, the method further comprises transmitting another portion of the AI model to another target device; and receiving gradients from the another target device to perform reduction of parameters for the another portion of the AI model V. Conclusion While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A system, comprising:
a parameter server communicatively connected to a target device, the parameter server comprises:
a data manager configured to store a master copy of an artificial intelligence (AI) model;
a transmitter configured to transmit a portion of the AI model to the target device, the target device comprising an integrated circuit chip having an on-chip memory of a size less than an entirety of the AI model, and a size of the portion being based at least on the on-chip memory size and a size of one or more layers of the AI model;
a batch manager configured to determine a microbatch size suitable for the target device; and
contemporaneously, with a set of microbatches of a training dataset being executed by the integrated circuit chip at the target device on a first subportion of the transmitted portion of the AI model stored in the on-chip memory to generate gradients,
a weight updater is configured to perform reduction of parameters for a second subportion of the transmitted portion of the AI model, and
the transmitter is further configured to send weights for a third subportion of the transmitted portion of the AI model to the target device.

2. The system of claim 1, wherein the weight updater is configured to perform reduction of parameters by:
receiving gradients from the target device, the gradients being generated by the target device executing the set of microbatches of the training dataset on the second subportion at the target device; and
generating an average of the received gradients.

3. The system of claim 2, wherein the weight updater is further configured to update the AI model with the average of the received gradients.

4. The system of claim 2, wherein the set of microbatches comprises a plurality of microbatches that are configured to be executed in sequential order, the set of microbatches forming a minibatch that comprises a number of samples per update for training of the AI model.

5. The system of claim 2, wherein the microbatch size is configurable based on a rate of executing the set of microbatches at the target device and a rate of communication between the target device and the parameter server.

6. A system, comprising:
a parameter server communicatively connected to a target device, the parameter server comprises:
a data manager configured to store a master copy of an artificial intelligence (AI) model;
a transmitter configured to transmit a portion of the AI model to the target device;
a batch manager configured to determine a microbatch size suitable for the target device; and
contemporaneously, with a set of microbatches of a training dataset being executed at the target device on a first subportion of the transmitted portion of the AI model to generate gradients,
a weight updater is configured to perform reduction of parameters for a second subportion of the transmitted portion of the AI model, and
the transmitter is further configured to send weights for a third subportion of the transmitted portion of the AI model to the target device,
wherein the parameter server further comprises a precision formatter configured to:
convert weights for a fourth subportion of the transmitted portion of the AI model to a first precision format prior to sending the weights to the target device;
convert gradients received from the target device to a second precision format; and
update the weights using the converted gradients.

7. The system of claim 1, wherein the transmitter is further configured to transmit another portion of the AI model to another target device; and the weight updater is further configured to receive gradients from the another target device to perform reduction of parameters for the another portion of the AI model.

8. A method implemented in a parameter server, comprising:
storing a master copy of an artificial intelligence (AI) model;
transmitting a portion of the AI model to a target device, the target device comprising an integrated circuit chip having an on-chip memory of a size less than an entirety of the AI model, and a size of the portion being based at least on the on-chip memory size and a size of one or more layers of the AI model;
determining a microbatch size suitable for the target device; and
contemporaneously, with a set of microbatches of a training dataset being executed by the integrated circuit chip at the target device on a first subportion of the transmitted portion of the AI model stored in the on-chip memory to generate gradients, performing reduction of parameters for a second subportion of the transmitted portion of the AI model and sending weights for a third subportion of the transmitted portion of the AI model to the target device.

9. The method of claim 8, wherein the performing reduction of parameters comprises:
receiving gradients from the target device, the gradients being generated from executing the set of microbatches of the training dataset on the second subportion at the target device; and
generating an average of the received gradients.

10. The method of claim 9, further comprising:
updating the AI model with the average of the received gradients.

11. The method of claim 9, wherein the set of microbatches comprises a plurality of microbatches that are configured to be executed in sequential order, the set of microbatches forming a minibatch that comprises a number of samples per update for training of the AI model.

12. The method of claim 9, wherein the microbatch size is configurable based on a rate of executing the set of microbatches at the target device and a rate of communication between the target device and the parameter server.

13. A method implemented in a parameter server, comprising:
storing a master copy of an artificial intelligence (AI) model;
transmitting a portion of the AI model to a target device;
determining a microbatch size suitable for the target device;
contemporaneously, with a set of microbatches of a training dataset being executed at the target device on a first subportion of the transmitted portion of the AI model to generate gradients, performing reduction of parameters for a second subportion of the transmitted portion of the AI model and sending weights for a third subportion of the transmitted portion of the AI model to the target device;
converting weights for a fourth subportion of the transmitted portion of the AI model to a first precision format prior to sending the weights to the target device;
converting gradients received from the target device to a second precision format; and
updating the weights using the converted gradients.

14. The method of claim 8, further comprising:
transmitting another portion of the AI model to another target device; and
receiving gradients from the another target device to perform reduction of parameters for the another portion of the AI model.

15. A computer program product comprising a computer-readable storage device having computer program logic recorded thereon that when executed by a processor-based computer system causes the processor-based system to perform a method, the method comprising:
storing a master copy of an artificial intelligence (AI) model at a parameter server;
transmitting a portion of the AI model to a target device, the target device comprising an integrated circuit chip having an on-chip memory of a size less than an entirety of the AI model, and a size of the portion being based at least on the on-chip memory size and a size of one or more layers of the AI model;
determining a microbatch size suitable for the target device; and
contemporaneously, with a set of microbatches of a training dataset being executed by the integrated circuit chip at the target device on a first subportion of the transmitted portion of the AI model stored in the on-chip memory to generate gradients, performing reduction of parameters for a second subportion of the transmitted portion of the AI model and sending weights for a third subportion of the transmitted portion of the AI model to the target device.

16. The computer program product of claim 15, wherein the performing reduction of parameters comprises:
receiving gradients from the target device, the gradients being generated from executing the set of microbatches of the training dataset on the second subportion at the target device; and
generating an average of the received gradients.

17. The computer program product of claim 16, wherein the method further comprises:
updating the AI model with the average of the received gradients.

18. The computer program product of claim 16, wherein the set of microbatches comprises a plurality of microbatches that are configured to be executed in sequential order, the set of microbatches forming a minibatch that comprises a number of samples per update for training of the AI model.

19. The computer program product of claim 15, wherein the microbatch size is configurable based on a rate of executing the set of microbatches at the target device and a rate of communication between the target device and the parameter server.

20. The computer program product of claim 15, wherein the method further comprises:
transmitting another portion of the AI model to another target device; and
receiving gradients from the another target device to perform reduction of parameters for the another portion of the AI model.

* * * * *